(12) United States Patent
Shirato et al.

(10) Patent No.: US 9,388,060 B2
(45) Date of Patent: Jul. 12, 2016

(54) ELECTROLYSIS WATER-MAKING APPARATUS

(75) Inventors: Masayasu Shirato, Tokyo (JP); Koki Matsuyama, Tokyo (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 113 days.

(21) Appl. No.: 14/239,873

(22) PCT Filed: Jun. 15, 2012

(86) PCT No.: PCT/JP2012/065340
§ 371 (c)(1),
(2), (4) Date: Feb. 20, 2014

(87) PCT Pub. No.: WO2013/027477
PCT Pub. Date: Feb. 28, 2013

(65) Prior Publication Data
US 2014/0190821 A1    Jul. 10, 2014

(30) Foreign Application Priority Data

Aug. 24, 2011   (JP) ................................ 2011-182493

(51) Int. Cl.
*C25B 1/04*    (2006.01)
*C25B 9/00*    (2006.01)
(Continued)

(52) U.S. Cl.
CPC ............ *C02F 1/4674* (2013.01); *C02F 1/46104* (2013.01); *C02F 2201/4611* (2013.01); *C02F 2201/4618* (2013.01)

(58) Field of Classification Search
CPC .............. C25B 1/04; C25B 9/00; C25B 9/06; C02F 1/46; C02F 1/4674; C02F 2201/4618; C02F 2201/4611; C02F 1/46104
USPC .................................................. 204/232, 242
See application file for complete search history.

(56) References Cited

U.S. PATENT DOCUMENTS

| 6,428,689 B1 * | 8/2002 | Kameyama | C02F 1/46104 204/228.1 |
| 2001/0004962 A1 * | 6/2001 | Hirota | C02F 1/46104 204/228.1 |

(Continued)

FOREIGN PATENT DOCUMENTS

| CN | 1332120 A | 1/2002 |
| JP | 07-299458 A | 11/1995 |

(Continued)

OTHER PUBLICATIONS

Korean Intellectual Property Office, Notice to Submit Response issued in corresponding Korean Patent Application No. 10-2014-7003445 and English-language translation mailed Nov. 17, 2015.

(Continued)

*Primary Examiner* — Zulmariam Mendez
(74) *Attorney, Agent, or Firm* — Wood, Herron & Evans, LLP

(57) ABSTRACT

The electrolysis water-making apparatus (A) includes: an electrolytic cell (2); a raw material solution feed pump (3) used to supply the raw material solution (W1, W3) to the electrolytic cell (2); a raw material solution pipe (32, 36) connecting an outlet (3b) of the raw material solution feed pump (3) and an inlet (26) of the electrolytic cell (2); and an electrolyzed solution advection-deterring portion (40) formed in the raw material solution pipe (32, 36) between the outlet (3b) and the inlet (26). The raw material solution feed pump (3) is provided so that the outlet (3b) is disposed on an upper side of the inlet (26). A pitched pipe (32c) in which an end thereof near the inlet (26) is disposed on an upper side of another end thereof near the outlet (3b) is provided in at least a part of the electrolyzed solution advection-deterring portion (40).

9 Claims, 35 Drawing Sheets

(51) Int. Cl.
*C25B 9/06* (2006.01)
*C02F 1/46* (2006.01)
*C02F 1/467* (2006.01)
*C02F 1/461* (2006.01)

(56) References Cited

U.S. PATENT DOCUMENTS

2004/0144336 A1* 7/2004 Zagaja ............... F02B 43/10
 123/3
2004/0149663 A1* 8/2004 Nakanishi ............ C02F 1/4674
 210/98

FOREIGN PATENT DOCUMENTS

| JP | 08-089965 A | 4/1996 |
| JP | 2526567 Y | 11/1996 |
| JP | 09-290269 A | 11/1997 |
| JP | 10174972 A | 6/1998 |
| JP | 11-244859 A | 9/1999 |
| JP | 2001193114 A | 7/2001 |
| JP | 2006-088156 A | 4/2006 |
| JP | 2007301540 A | 11/2007 |
| KR | 100367895 B1 | 3/2003 |
| TW | 459793 | 10/2001 |
| TW | M395484 U1 | 1/2011 |
| WO | 2008032946 A1 | 3/2008 |

OTHER PUBLICATIONS

Japanese Patent Office, International Search Report issued in Application No. PCT/JP2012/065340, mailed Sep. 4, 2012, 6 pp.
Taiwanese Patent Office, Office Action issued in Application No. 101121094, mailed Nov. 8, 2013, 9 pp.
State Intellectual Property Office of the People'S Republic of China, Office Action issued in corresponding Chinese Patent Application No. 201280040643.8 and English-language translation, issued Nov. 24, 2014 (10 pages).
European Patent Office, Extended European Search Report issued in corresponding European Patent Application No. 12825947.0 dated Apr. 8, 2015.
Japanese Patent Office, Notice of Allowance issued in corresponding Japanese Patent Application No. 2013-529918 and English-language translation, mailed Apr. 21, 2015.

* cited by examiner

IMMEDIATELY AFTER INJECTION

AFTER 20 HOURS

AFTER 50 HOURS

AFTER 70 HOURS

REMAINING BY ADVECTION

DIFFUSION

AFTER 100 HOURS

REMAINING BY ADVECTION

DIFFUSION

AFTER 200 HOURS

REMAINING BY ADVECTION

DIFFUSION

IMMEDIATELY AFTER INJECTION

AFTER 20 HOURS

AFTER 50 HOURS

AFTER 70 HOURS

AFTER 100 HOURS

AFTER 200 HOURS

ELECTROLYSIS WATER-MAKING APPARATUS

TECHNICAL FIELD

The present invention relates to an electrolysis water-making apparatus used to make electrolysis water by electrolyzing an electrolyte solution as a raw material solution including a chlorine ion.

Priority is claimed on Japanese Patent Application No. 2011-182493, filed Aug. 24, 2011, the contents of which are incorporated herein by reference.

BACKGROUND ART

Conventionally, in the food production field or the like, an electrolysis water-making apparatus electrolyzes various electrolyte solutions (a raw material solution including a chlorine ion) so as to make electrolysis-sterilized water (electrolysis water), and the electrolysis-sterilized water is used for sterilization, disinfection or the like. For example, when an electrolyte solution including a chlorine ion such as a sodium chloride solution or a hydrochloric acid solution is electrolyzed, chlorine gas is produced through electrolytic oxidation, and by dissolving the chlorine gas in water, hypochlorous acid is generated. The electrolysis-sterilized water including the generated hypochlorous acid has many advantages compared to sterilized water prepared by dissolving sodium hypochlorite in water, such as the electrolysis-sterilized water exerts an excellent sterilization effect even when the chlorine concentration thereof is low, or it is not necessary to perform delicate concentration adjustment at each time of use.

The electrolysis water-making apparatus includes an electrolytic cell used to electrolyze an electrolyte solution, and a water supply system used to supply the electrolyte solution to the electrolytic cell. In addition, as the electrolytic cell, a bipolar electrolytic cell (series electrolytic cell) in which a plurality of electrode plates are arranged in series is widely used. The bipolar electrolytic cell is configured so that a plurality of electrode plates are arranged at intervals in a casing, an anode electrode and a cathode electrode are connected using welding to the electrode plate at one end in the axial direction thereof and to the electrode plate at the other end respectively, and electricity is conducted from the electrode plate (anode) at the one end via intermediate electrode plates to the electrode plate (cathode) at the other end.

In the electrolysis water-making apparatus, the water supply system supplies an electrolyte solution into the casing of the electrolytic cell, an electric current flows by applying a predetermined voltage to the electrolyte solution including chloride while the electrolyte solution is circulated, and chlorine gas is generated through oxidation reaction at the anode. The chlorine gas (or a liquid in which the chlorine gas is mixed) is removed from the electrolytic cell and is mixed with water, whereby hypochlorous acid is generated in the water, and electrolysis-sterilized water is made.

On the other hand, when the voltage applied between the electrodes of the electrolytic cell is cut off, thereby stopping electrolysis, and when a pump to supply an electrolyte solution to the electrolytic cell is stopped, an electrolyzed solution in which high-concentration chlorine gas or hypochlorous acid, non-electrolyzed hydrochloric acid, or the like is mixed remains in the electrolytic cell. In addition, in the present invention, such a remaining liquid in the electrolytic cell is referred to as the electrolyzed solution. When operations of the electrolytic cell and the pump are stopped, the electrolyzed solution in the electrolytic cell may flow back into a pipe (tube) connecting the electrolytic cell and the pump. By the flowback of the electrolyzed solution, corrosion of component parts such as a pump may occur due to chlorine gas or the like, and the lives of the component parts may be shortened.

Contrary to this, in the related art, a means of providing a check valve in a pipe connecting the electrolytic cell and the pump or a means of controlling the pump so that the operation of the pump used to supply an electrolyte solution is stopped after a lapse of a predetermined time in a state where the voltage applied between the electrodes of the electrolytic cell is stopped is adopted. Accordingly, the flowback of the electrolyzed solution from the electrolytic cell is prevented (for example, refer to Patent Document 1).

DOCUMENT OF RELATED ART

Patent Document

[Patent Document 1] Japanese Unexamined Patent Application, First Publication No. H7-299458

SUMMARY OF INVENTION

Technical Problem

However, in spite of adopting a means to prevent the flowback of an electrolyzed solution in the electrolytic cell using a non-return mechanism such as a check valve, there is a case where the electrolyzed solution intrudes from the electrolytic cell into the pipe immediately after the operation of the electrolysis water-making apparatus has stopped, and thus the corrosion of component parts such as a check valve, a pump, a pipe (tube), a gasket, or an O-ring occurs.

It has been confirmed from the corrosion state or the like of the component parts, that this phenomenon is not caused only due to the flowback of the electrolyzed solution, or due to mere diffusion associated with concentration equilibrium. Therefore, it is strongly desired that the cause thereof be clarified and a means to prevent the corrosion of component parts be adopted.

On the other hand, in the operation of the electrolysis water-making apparatus, there is the following problem. In the related art, when the operation of electrolysis is restarted (operated) from a state of a halt state thereof during operation of the electrolysis water-making apparatus, there is a case where the entire apparatus is stopped by error due to the occurrence of overcurrent in the electrolysis cell. The prevention of such an error stop state is essential to stably operate the electrolysis water-making apparatus. The prevention of such an error stop state is also an issue in the electrolysis water-making apparatus.

Solution to Problem

According to a first aspect of the present invention, an electrolysis water-making apparatus which is an apparatus for making electrolysis water by electrolyzing a raw material solution including a chlorine ion includes: an electrolytic cell; a raw material solution feed pump used to supply the raw material solution to the electrolytic cell; a raw material solution pipe connecting an outlet of the raw material solution feed pump allowing the raw material solution to be discharged therefrom and an inlet of the electrolytic cell allowing the raw material solution to flow thereinto; and an electrolyzed solution advection-deterring portion formed in the raw material solution pipe between the outlet and the inlet. The raw material solution feed pump is provided so that the outlet is disposed on an upper side of the inlet. In addition, a pitched pipe in which an end thereof near the inlet is disposed on an upper side of another end thereof near the outlet is provided in at least a part of the electrolyzed solution advection-deterring portion.

According to a second aspect of the present invention, in the first aspect, the electrolysis water-making apparatus further includes: a dilution water pump used to supply dilution water used to dilute the raw material solution so that the raw material solution has a predetermined electrolyte concentration; a dilution water pipe connecting a second outlet of the dilution water pump allowing the dilution water to be discharged therefrom and a second inlet of the electrolytic cell allowing the dilution water to flow thereinto; and a second electrolyzed solution advection-deterring portion formed in the dilution water pipe between the second outlet and the second inlet. The dilution water pump is provided so that the second outlet is disposed on a lower side of the second inlet. In addition, a second pitched pipe in which an end thereof near the second inlet is disposed on a lower side of another end thereof near the second outlet is provided in at least a part of the second electrolyzed solution advection-deterring portion.

According to a third aspect of the present invention, in the first aspect, the electrolysis water-making apparatus further includes a fixing means fixing the raw material solution pipe in a state where the electrolyzed solution advection-deterring portion is formed.

According to a fourth aspect of the present invention, in the second aspect, the electrolysis water-making apparatus further includes a second fixing means fixing the dilution water pipe in a state where the second electrolyzed solution advection-deterring portion is formed.

According to a fifth aspect of the present invention, in any one of the first to fourth aspects, at least one of the electrolyzed solution advection-deterring portion and the second electrolyzed solution advection-deterring portion is formed into an annular shape wound around a central axis extending in a horizontal direction.

According to a sixth aspect of the present invention, in any one of the first to fourth aspects, at least one of the electrolyzed solution advection-deterring portion and the second electrolyzed solution advection-deterring portion is formed to include at least one of a U-shaped part and an inverted U-shaped part curved around a central axis extending in a horizontal direction.

According to a seventh aspect of the present invention, in any one of the first to fourth aspects, at least one of the electrolyzed solution advection-deterring portion and the second electrolyzed solution advection-deterring portion is formed into an annular shape wound around a central axis extending in a vertical direction.

According to an eighth aspect of the present invention, in any one of the first to fourth aspects, the electrolyzed solution advection-deterring portion is formed to include a tiered part sloping upward as it approaches from the outlet toward the inlet.

According to a ninth aspect of the present invention, in the second or fourth aspect, the second electrolyzed solution advection-deterring portion is formed to include a second tiered part sloping downward as it approaches from the second outlet toward the second inlet.

Effects of Invention

The inventor clarified, as described below, that the cause of a phenomenon is advection of the electrolyzed solution, wherein the phenomenon is that an electrolyzed solution intrudes from the electrolytic cell into the pipe after the operation of the electrolysis water-making apparatus has stopped in spite of preventing the flowback of the electrolyzed solution in the electrolytic cell by the non-return mechanism. Based on this, in the electrolysis water-making apparatus of the first aspect of the present invention, the raw material solution pipe is arranged so as to form the electrolyzed solution advection-deterring portion including the pitched pipe in which the end thereof near the inlet of the electrolytic cell is disposed on the upper side of the end thereof near the outlet of the raw material solution feed pump. Therefore, even when the raw material solution feed pump is provided so that the outlet of the raw material solution feed pump is disposed on the upper side of the inlet of the electrolytic cell, it is possible to prevent an electrolyzed solution from being advected from the electrolytic cell into the pipe connected to the raw material solution feed pump immediately after the operation thereof has stopped.

Consequently, the corrosion of component parts due to an electrolyzed solution can be prevented, and it is possible to extend the lives of the component parts. In addition, it is possible to decrease the frequency of replacement of the component parts, and to provide an electrolysis water-making apparatus having excellent durability, economic efficiency, and reliability.

In addition, the inventor clarified that the cause of the phenomenon in which an electrolyzed solution intrudes from the electrolytic cell into a pipe is advection of the electrolyzed solution. Furthermore, together with such a phenomenon in which an electrolyzed solution is advected from the electrolytic cell to the pipe, it was found that a phenomenon occurs in which a raw material solution or dilution water is advected from a pipe to the electrolytic cell in an opposite manner. It was ascertained that such advection of the raw material solution or the dilution water from the pipe to the electrolytic cell causes skewed distribution in the up-and-down direction of chlorine ion concentration in the electrolytic cell, and as a result of the skewed distribution, the error stop state is caused due to occurrence of overcurrent in the electrolytic cell when the electrolysis in a halt state is restarted.

Accordingly, the above-described electrolyzed solution advection-deterring portion prevents the phenomenon in which an electrolyzed solution is advected from the electrolytic cell toward a raw material solution pipe, and prevents the phenomenon in which a raw material solution is advected from the raw material solution pipe toward the electrolytic cell in an opposite manner. Therefore, it is possible to prevent the skewed distribution of chlorine ion concentration in the electrolytic cell. As a result, it is possible to prevent occurrence of overcurrent when the operation of the electrolytic cell is restarted and to prevent the error stop state of the apparatus associated with it, and to provide an electrolysis water-making apparatus capable of more stably operating.

In the electrolysis water-making apparatus of the second aspect of the present invention, based on the cause of the above phenomenon clarified by the inventor, the dilution water pipe is arranged so as to form the second electrolyzed solution advection-deterring portion including the second pitched pipe in which the end thereof near the second inlet of the electrolytic cell is disposed on the lower side of the end thereof near the second outlet of the dilution water pump. Therefore, even when the dilution water pump is provided so that the outlet of the dilution water pump is disposed on the lower side of the inlet of the electrolytic cell, it is possible to prevent an electrolyzed solution from being advected from the electrolytic cell into the pipe connected to the dilution water pump immediately after the operation thereof has stopped.

Consequently, the corrosion of component parts due to an electrolyzed solution can be prevented, and it is possible to further extend the lives of the component parts. In addition, it is possible to decrease the frequency of replacement of the component parts, and to provide an electrolysis water-making apparatus having further excellent durability, economic efficiency, and reliability.

The electrolysis water-making apparatus of the third aspect of the present invention includes the fixing means fixing the raw material solution pipe in a state where the electrolyzed solution advection-deterring portion is formed. Therefore, it is possible to hold the raw material solution pipe in a state where the electrolyzed solution advection-deterring portion is formed. In addition, the electrolysis water-making apparatus of the fourth aspect of the present invention includes the second fixing means fixing the dilution water pipe in a state where the second electrolyzed solution advection-deterring portion is formed. Therefore, it is possible to hold the dilution water pipe in a state where the second electrolyzed solution advection-deterring portion is formed. Accordingly, it is possible to reliably prevent the electrolyzed solution from intruding from the electrolytic cell into the pipe connected to the raw material solution feed pump or the dilution water pump. In addition, in an opposite manner, it is possible to reliably prevent the raw material solution or the dilution water from intruding from the pipe connected to the raw material solution feed pump or the dilution water pump into the electrolytic cell.

In the electrolysis water-making apparatus of the fifth aspect of the present invention, at least one of the electrolyzed solution advection-deterring portion and the second electrolyzed solution advection-deterring portion is formed into an annular shape wound around a central axis extending in the horizontal direction. Therefore, in the raw material solution pipe, it is possible to reliably and easily form the electrolyzed solution advection-deterring portion including the pitched pipe in which the end thereof near the inlet of the electrolytic cell is disposed on the upper side of the end thereof near the outlet of the raw material solution feed pump. In addition, in the dilution water pipe, it is possible to reliably and easily form the second electrolyzed solution advection-deterring portion including the second pitched pipe in which the end thereof near the second inlet of the electrolytic cell is disposed on the lower side of the end thereof near the second outlet of the dilution water pump.

In the electrolysis water-making apparatus of the sixth aspect of the present invention, at least one of the electrolyzed solution advection-deterring portion and the second electrolyzed solution advection-deterring portion is formed to include at least one of a U-shaped part and an inverted U-shaped part curved around a central axis extending in the horizontal direction. Therefore, in the raw material solution pipe, it is possible to reliably and easily form the electrolyzed solution advection-deterring portion including the pitched pipe in which the end thereof near the inlet of the electrolytic cell is disposed on the upper side of the end thereof near the outlet of the raw material solution feed pump. In addition, in the dilution water pipe, it is possible to reliably and easily form the second electrolyzed solution advection-deterring portion including the second pitched pipe in which the end thereof near the second inlet of the electrolytic cell is disposed on the lower side of the end thereof near the second outlet of the dilution water pump.

In the electrolysis water-making apparatus of the seventh aspect of the present invention, at least one of the electrolyzed solution advection-deterring portion and the second electrolyzed solution advection-deterring portion is formed into an annular shape wound around a central axis extending in the vertical direction. Therefore, in the raw material solution pipe, it is possible to reliably and easily form the electrolyzed solution advection-deterring portion including the pitched pipe in which the end thereof near the inlet of the electrolytic cell is disposed on the upper side of the end thereof near the outlet of the raw material solution feed pump. In addition, in the dilution water pipe, it is possible to reliably and easily form the second electrolyzed solution advection-deterring portion including the second pitched pipe in which the end thereof near the second inlet of the electrolytic cell is disposed on the lower side of the end thereof near the second outlet of the dilution water pump.

In the electrolysis water-making apparatus of the eighth aspect of the present invention, the electrolyzed solution advection-deterring portion is formed to include the tiered part sloping upward as it approaches from the outlet of the raw material solution feed pump toward the inlet of the electrolytic cell. Therefore, in the raw material solution pipe, it is possible to reliably and easily form the electrolyzed solution advection-deterring portion including the pitched pipe in which the end thereof near the inlet of the electrolytic cell is disposed on the upper side of the end thereof near the outlet of the raw material solution feed pump.

In the electrolysis water-making apparatus of the ninth aspect of the present invention, the second electrolyzed solution advection-deterring portion is formed to include the second tiered part sloping downward as it approaches from the second outlet of the dilution water pump toward the second inlet of the electrolytic cell. Therefore, in the dilution water pipe, it is possible to reliably and easily form the second electrolyzed solution advection-deterring portion including the second pitched pipe in which the end thereof near the second inlet of the electrolytic cell is disposed on the lower side of the end thereof near the second outlet of the dilution water pump.

DESCRIPTION OF EMBODIMENTS

First Embodiment

Hereinafter, an electrolysis water-making apparatus related to a first embodiment of the present invention is described with reference to FIGS. 1 to 8B. This embodiment relates to an electrolysis water-making apparatus for making electrolysis water by electrolyzing an electrolyte solution as a raw material solution including a chlorine ion, and in particular, to an electrolysis water-making apparatus for making electrolysis-sterilized water including hypochlorous acid.

Figure 1:
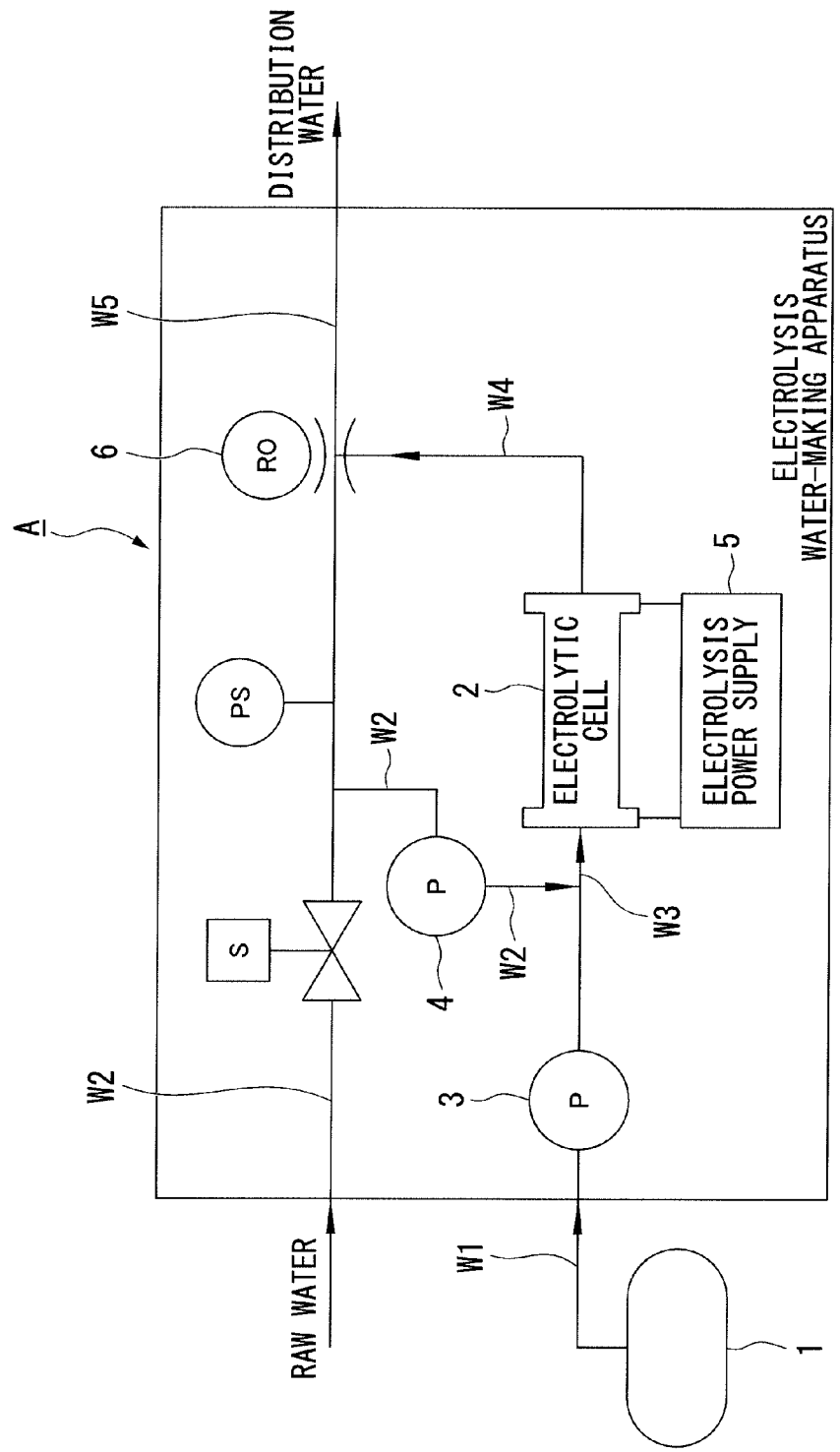
FIG. 1 is a diagram showing an electrolysis water-making apparatus related to first to fourth embodiments of the present invention.

As shown in FIG. 1, an electrolysis water-making apparatus A of this embodiment includes a tank 1 storing an undiluted solution W1 (a raw material solution including a chlorine ion) such as a hydrochloric acid solution or a sodium chloride solution, an electrolytic cell 2 to which an electrolyte solution W3 (a raw material solution including a chlorine ion) composed by mixing the undiluted solution W1 and water W2 (dilution water) is supplied and which electrolyzes the electrolyte solution W3, and a raw material solution feed pump 3 used to feed the undiluted solution W1 from the tank 1 to the electrolytic cell 2. Furthermore, the electrolysis water-making apparatus A includes a dilution water pump 4 which feeds the water W2 between the tank 1 and the electrolytic cell 2 so as to dilute the undiluted solution W1 to have a predetermined concentration and thus which produces the electrolyte solution W3, an electrolysis power supply 5 used to supply electric power to the electrolytic cell 2, and a mixer 6 used to produce electrolysis-sterilized water W5 (electrolysis water) by mixing chlorine gas (or an electrolyzed solution W4 in which the chlorine gas is mixed) and treated water W2 together, wherein the chlorine gas is generated by electrolyzing the electrolyte solution W3 at the electrolytic cell 2.

Figure 2:
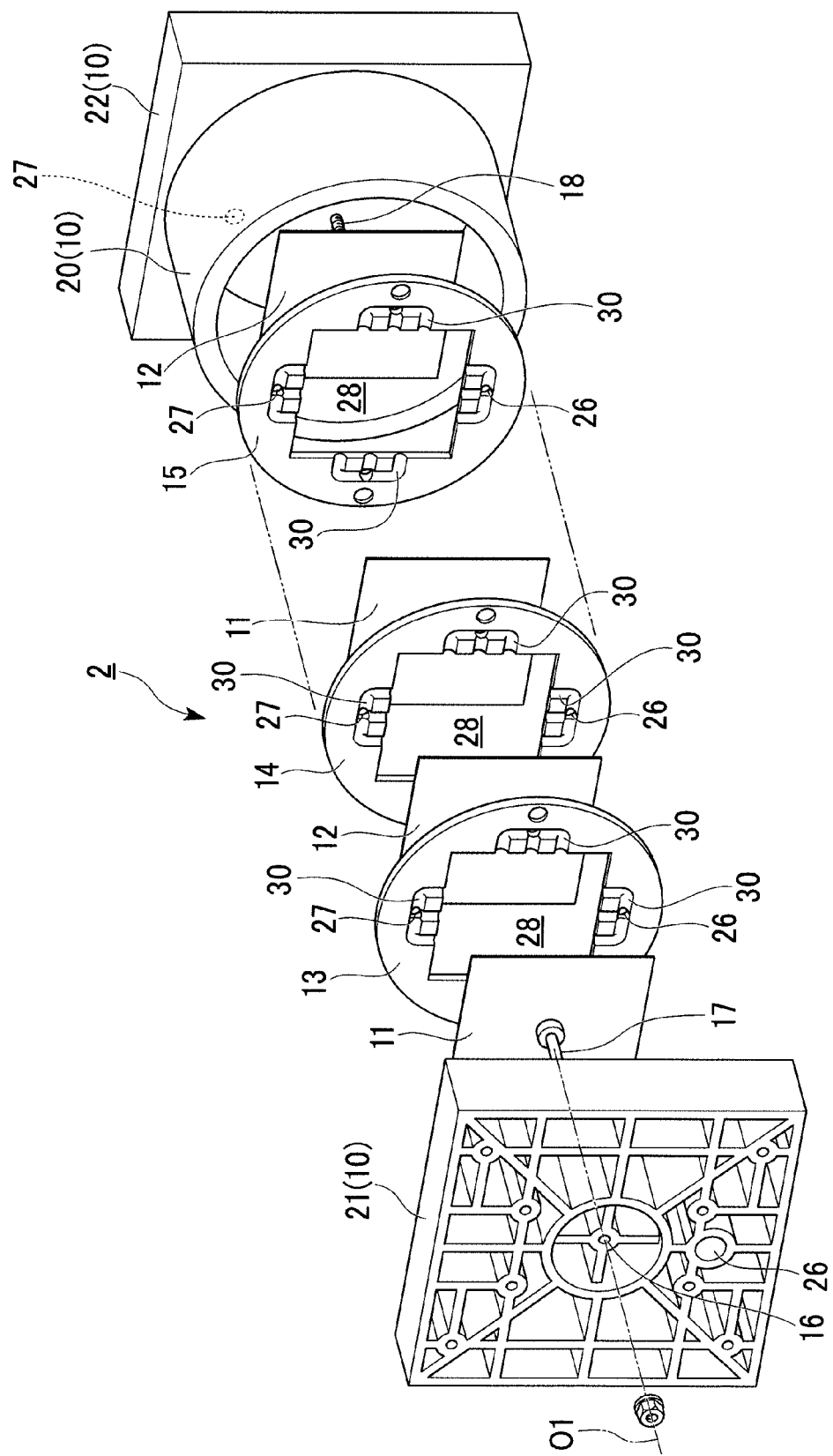
FIG. 2 is an exploded perspective view showing an electrolytic cell of the electrolysis water-making apparatus related to the first to fourth embodiments of the present invention.

The electrolytic cell 2 is a bipolar electrolytic cell in which a plurality of electrode plates are arranged in series. As shown in FIGS. 1 and 2, the electrolytic cell 2 includes a casing 10 allowing the electrolyte solution W3 to flow therein, a plurality of electrode plates 11 and 12 arranged at intervals in a direction of an axis O1 inside the casing 10, a plurality of spacers 13, 14 and 15 holding the electrode plates 11 and 12 in a state where the electrode plates 11 and 12 are arranged at intervals in the direction of the axis O1, a pair of electrodes 17 and 18 used to supply electric power from the electrolysis power supply 5 to the electrode plates 11 and 12, wherein the electrodes 17 and 18 are provided so as to be inserted in electrode through-holes 16 penetrating the center part of the casing 10 from the outside to the inside thereof, and are connected to a pair of electrode plates 11 and 12 positioned at both ends in the direction of the axis O1, respectively.

The casing 10 is formed using plastics such as polyvinyl chloride resin, polycarbonate resin, or polyacrylate acrylate resin. As shown in FIG. 2, the casing 10 includes a cylindrical body 20 in which the central axis thereof is disposed in the direction of the axis O1, and a pair of side plates 21 and 22 integrally fixed to both ends in the direction of the axis O1 of the body 20 so as to seal openings of the body 20.

In one side plate 21, an inlet 26 penetrating a portion near the lower end (a lower side of the electrode through-hole 16) of the side plate 21 from the outer surface to the inner surface thereof is formed so as to open in the direction of the axis O1. In the other side plate 22, an outlet 27 penetrating a portion near the upper end (an upper side of the electrode through-hole 16) of the side plate 22 from the outer surface to the inner surface thereof is formed so as to open in the direction of the axis O1.

The plurality of electrode plates 11 and 12 are plates composed of metal such as titanium alloy, and each electrode plate is formed into a square plate shape. In addition, the electrode plates 11 and 12 are arranged between the side plates 21 and 22 disposed to face each other with a predetermined space, so that each plate surface of the electrode plates 11 and 12 is perpendicular to the facing direction (the direction of the axis O1) of the side plates 21 and 22. The electrodes 17 and 18 composed of metal are fixed and connected to the center parts of the electrode plates 11 and 12 disposed at both ends in the direction of the axis O1.

The plurality of spacers 13, 14 and 15 are formed into an approximately circular plate shape having an outer diameter approximately the same as the inner diameter of the body 20 of the casing 10. Each of the spacers 13, 14 and 15 is provided with a square-shaped through-hole penetrating the center part of each spacer from one surface to the other surface thereof, wherein the through-hole composes an electrolysis chamber 28. In addition, each of the spacers 13, 14 and 15 is provided with an outlet 27 penetrating a portion above the through-hole (28) from one surface to the other surface thereof, and with an inlet 26 penetrating a portion below the through-hole (28) from one surface to the other surface thereof. Each of the outlet 27 and the inlet 26 communicates with the through-hole via a groove-shaped fluid channel 30 formed on the one surface, wherein the through-hole composes the electrolysis chamber 28.

Figure 3:
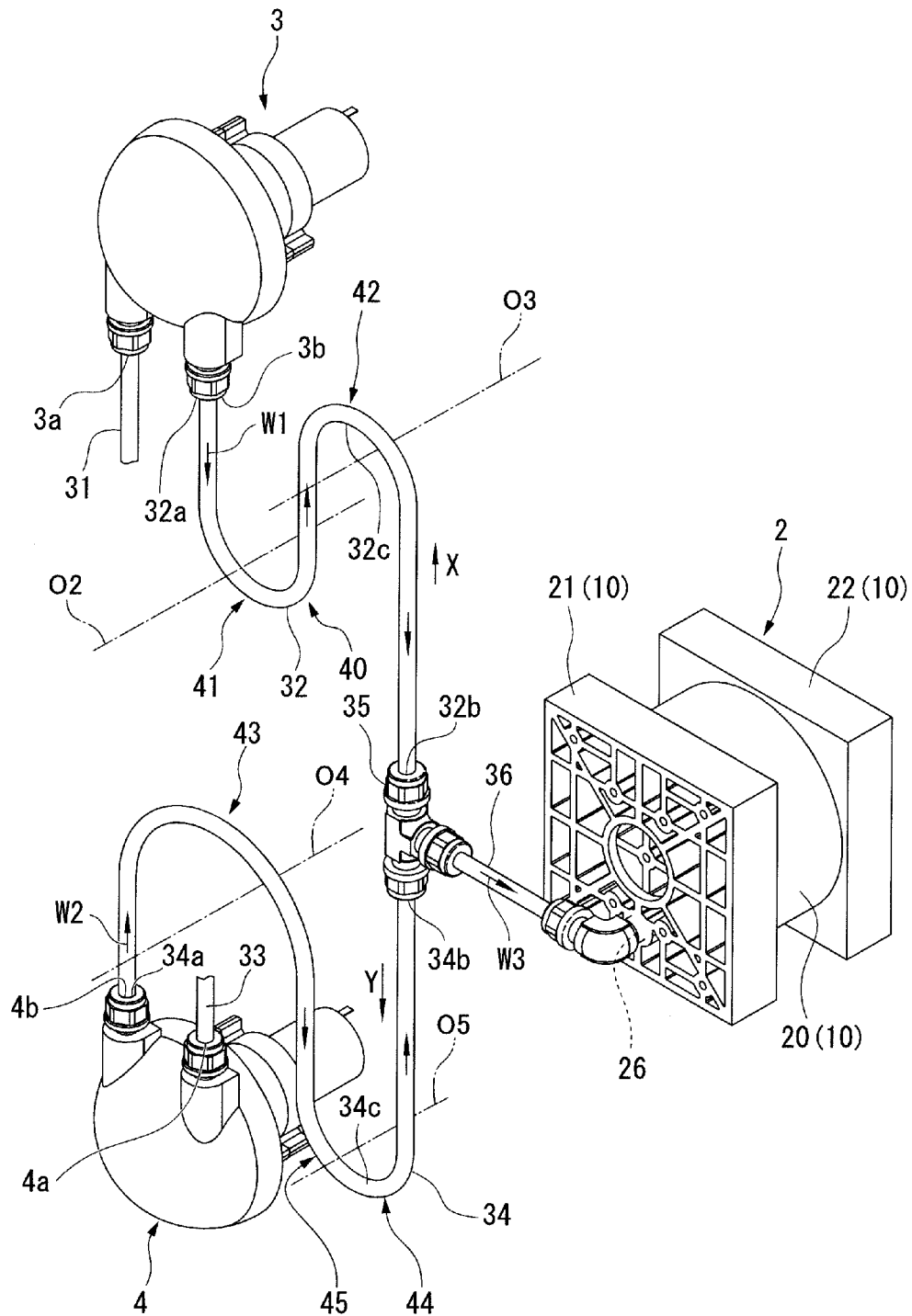
FIG. 3 is a perspective view showing the electrolysis water-making apparatus related to the first embodiment of the present invention.

As shown in FIGS. 1, 2 and 3, the raw material solution feed pump 3 as a water supply system of this embodiment is provided so that a tube 31 connects the tank 1 and an inlet 3a allowing the undiluted solution W1 to flow thereinto, and so that a raw material solution tube 32 (raw material solution pipe) and a tube 36 (raw material solution pipe) connect an outlet 3b (outlet) allowing the undiluted solution W1 to be discharged therefrom and the inlet 26 allowing the electrolyte solution W3 to flow into the electrolysis chambers 28 of the electrolytic cell 2. The dilution water pump 4 is provided so that a tube 33 connects a raw water source and an inlet 4a allowing the water W2 to flow thereinto, and so that a dilution water tube 34 (dilution water pipe) and the tube 36 (dilution water pipe) connect an outlet 4b (second outlet) allowing the water W2 to be discharged therefrom and the inlet 26 (second inlet) of the electrolytic cell 2.

As the raw material solution feed pump 3 and the dilution water pump 4 as a water supply system of this embodiment, tube pumps are used. That is, in the electrolysis water-making apparatus A of this embodiment, the raw material solution feed pump 3 or the dilution water pump 4 stops in a state of pinching a tube at the same time as the operation stops, and thereby a non-return function is exerted. Therefore, a check valve in the related art is not provided in a piping route connecting the outlet 3b of the raw material solution feed pump 3 or the outlet 4b of the dilution water pump 4 to the inlet 26 of the electrolytic cell 2. In addition, it is more effective and preferable that the present invention be applied to an apparatus of a closed system provided with such a non-return mechanism.

In this embodiment, as shown in FIG. 3, each of the tubes 32 and 34 connected to the outlet 3b of the raw material solution feed pump 3 and to the outlet 4b of the dilution water pump 4 respectively is connected to a T-fitting 35, and the tube 36 (a raw material solution pipe, a dilution water pipe) connects the T-fitting 35 and the inlet 26 (an inlet, a second inlet) of the electrolytic cell 2. Therefore, the undiluted solution W1 and the dilution water W2 are mixed together at the T-fitting 35, thereby producing the electrolyte solution W3, and the electrolyte solution W3 is supplied to the electrolytic cell 2.

In addition, in this embodiment, the tubes 32 and 36 connecting the outlet 3b of the raw material solution feed pump 3 and the inlet 26 of the electrolytic cell 2 can be regarded as one pipe (raw material solution pipe). Similarly, the tubes 34 and 36 connecting the outlet 4b of the dilution water pump 4 and the inlet 26 of the electrolytic cell 2 can be regarded as one pipe (dilution water pipe). In addition, the inlet 26 has both functions as an inlet allowing the undiluted solution W1 to flow into the electrolytic cell 2 and as an inlet (second inlet) allowing the water W2 to flow into the electrolytic cell 2.

In this embodiment, the raw material solution feed pump 3 is arranged so that the outlet 3b of the raw material solution feed pump 3 is disposed on the upper side of the inlet 26 of the electrolytic cell 2. In other words, the outlet 3b is positioned above a horizontal plane in which the inlet 26 is positioned. In addition, the dilution water pump 4 is arranged so that the outlet 4b of the dilution water pump 4 is disposed on the lower side of the inlet 26 of the electrolytic cell 2. In other words, the outlet 4b is positioned below a horizontal plane in which the inlet 26 is positioned.

In the electrolysis water-making apparatus A of this embodiment, the raw material solution tube 32 is arranged so as to form an electrolyzed solution advection-deterring portion 40 between one end 32a connected to the outlet 3b of the raw material solution feed pump 3 and the other end 32b connected (directly, or indirectly via the tube 36) to the inlet 26 of the electrolytic cell 2, wherein the electrolyzed solution advection-deterring portion 40 is configured so that a part thereof near the other end 32b is disposed on the upper side of another part thereof near the one end 32a. That is, the electrolyzed solution advection-deterring portion 40 is formed in the raw material solution tube 32 between the one end 32a (or the outlet 3b) and the other end 32b (or the inlet 26).

In this embodiment, the raw material solution tube 32, as it approaches from the one end 32a toward the other end 32b, extends downward from the one end 32a, extends upward after curving around a central axis O2 extending in a lateral direction (the horizontal direction), and further extends downward after curving around a central axis O3 extending in the lateral direction (the horizontal direction), and the other end 32b is connected to the inlet 26 of the electrolytic cell 2. In addition, the other end 32b is connected to the inlet 26 via the T-fitting 35 and via the tube 36, and thus a structure of connecting the other end 32b to the inlet 26 includes not only a direct connection but also such an indirect connection. By arranging the raw material solution tube 32 like this, a U-shaped part 41 and an inverted U-shaped part 42 are formed between the one end 32a and the other end 32b, and the electrolyzed solution advection-deterring portion 40 configured so that the part thereof near the other end 32b is disposed on the upper side of the part thereof near the one end 32a is formed using the U-shaped part 41 and the inverted U-shaped part 42. That is, the electrolyzed solution advection-deterring portion 40 is formed to include the U-shaped part 41 and the inverted U-shaped part 42.

The term "configured so that a part thereof near the other end 32b is disposed on the upper side of another part thereof near the one end 32a" means that there is a pipeline having a slope downward as it approaches from the other end 32b toward the one end 32a. Specifically, a downward slope pipeline 32c (a pitched pipe) sloping downward as it approaches from the other end 32b (or the inlet 26) toward the one end 32a (or the outlet 3b) is formed by the U-shaped part 41 and the inverted U-shaped part 42. The electrolyzed solution advection-deterring portion 40 is formed so that the downward slope pipeline 32c is a principal part thereof. That is, the downward slope pipeline 32c is provided in at least a part of the electrolyzed solution advection-deterring portion 40. In addition, the downward slope pipeline 32c is disposed between the U-shaped part 41 and the inverted U-shaped part 42.

Furthermore, in the electrolysis water-making apparatus A of this embodiment, the dilution water tube 34 is arranged so as to form a second electrolyzed solution advection-deterring portion 45 between one end 34a and the other end 34b, wherein the second electrolyzed solution advection-deterring portion 45 is configured so that a part thereof near the other end 34b is disposed on the lower side of another part thereof near the one end 34a. That is, the second electrolyzed solution advection-deterring portion 45 is formed in the dilution water tube 34 between the one end 34a (or the outlet 4b) and the other end 34b (or the inlet 26).

In this embodiment, the dilution water tube 34, as it approaches toward the other end 34b from the one end 34a connected to the outlet 4b of the dilution water pump 4, extends upward from the one end 34a, extends downward after curving around a central axis O4 extending in the lateral direction (the horizontal direction), and further extends upward after curving around a central axis O5 extending in the lateral direction (the horizontal direction), and the other end 34b is connected (directly, or indirectly via the T-fitting 35 and via the tube 36) to the inlet 26 of the electrolytic cell 2. By arranging the dilution water tube 34 like this, an inverted U-shaped part 43 and a U-shaped part 44 are formed between the one end 34a and the other end 34b, and the second electrolyzed solution advection-deterring portion 45 configured so that the part thereof near the other end 34b is disposed on the lower side of the part thereof near the one end 34a is formed using the inverted U-shaped part 43 and the U-shaped part 44. That is, the second electrolyzed solution advection-deterring portion 45 is formed to include the inverted U-shaped part 43 and the U-shaped part 44.

The term "configured so that a part thereof near the other end 34b is disposed on the lower side of another part thereof near the one end 34a" means that there is a pipeline having a slope upward as it approaches from the other end 34b toward the one end 34a. Specifically, an upward slope pipeline 34c (a second pitched pipe) sloping upward as it approaches from the other end 34b (or the inlet 26) toward the one end 34a (or the outlet 4b) is formed by the inverted U-shaped part 43 and the U-shaped part 44. The second electrolyzed solution advection-deterring portion 45 is formed so that the upward slope pipeline 34c is a principal part thereof. That is, the upward slope pipeline 34c is provided in at least a part of the second electrolyzed solution advection-deterring portion 45. In addition, the upward slope pipeline 34c is disposed between the inverted U-shaped part 43 and the U-shaped part 44.

In addition, the raw material solution tube 32 and the dilution water tube 34 which are arranged as described above are positioned and fixed by fixing means (not shown) (a fixing means, a second fixing means) such as bands in a state where the electrolyzed solution advection-deterring portions 40 and 45 are formed.

Next, in the electrolysis water-making apparatus A of this embodiment having the above-described configuration, the electrolysis power supply 5 supplies electric power to the electrodes 17 and 18 of the electrolytic cell 2, the undiluted solution W1 is fed from the tank 1 through the operation of the raw material solution feed pump 3, and the water W2 is fed from a water source through the operation of the dilution water pump 4. The undiluted solution W1 and the dilution water W2 which have flowed through the tubes 32 and 34 respectively are mixed together at the T-fitting 35, and the electrolyte solution W3 which has been adjusted to have a predetermined electrolyte concentration is supplied through the inlet 26 of the electrolytic cell 2 into the electrolysis chambers 28 inside the casing 10, and flows therein.

When the electrolyte solution W3 flows through the electrolysis chambers 28 in a state where electric power is supplied to the electrodes 17 and 18, chlorine gas is generated through electrolysis. The chlorine gas (or the electrolyzed solution W4 in which the chlorine gas is mixed) is removed from the outlet 27 of the electrolytic cell 2 and is mixed with the treated water W2 at the mixer 6, whereby the electrolysis-sterilized water W5 is produced.

In an electrolysis water-making apparatus in the related art, the electrolyzed solution W4 may be advected from the electrolytic cell 2 into the tubes 32 and 34 immediately after the operation thereof is stopped. Accordingly, in a case where tube pumps are used as the pumps 3 and 4 as in this embodiment, deterioration such as discoloration or swelling of a tube may occur. On the other hand, in a case where a check valve is used, a life or the like of a gasket or a valve body may be shortened.

Contrary to this, in order to clarify this phenomenon, the inventor carried out first and second experiments of electrolyzed solution behavior.

First, the first experiment of electrolyzed solution behavior is described with reference to FIGS. 4A to 4D and 5A to 5D. In the first experiment of electrolyzed solution behavior, the experiment was carried out in accordance with a procedure shown in the following (1) to (5).

(1) 10-ml test tubes 46 and 47 were prepared in threes, and water (tap water), 3% hydrochloric acid solution, and 21% hydrochloric acid solution were injected into the test tubes 46 or 47 in 5-ml volumes. The three test tubes 46 are referred to as a first set, and the three test tubes 47 are referred to as a second set.

(2) 3% hydrochloric acid solution was used as the electrolyte solution W3, the electrolysis water-making apparatus A was continuously operated for 3 hours after the electrolyte solution W3 was supplied into the electrolytic cell 2, and the electrolyzed solution W4 was obtained from the electrolytic cell 2 after the continuous operation. In the obtained electrolyzed solution W4, the available chlorine concentration thereof was 265.5 ppm.

(3) After the obtained electrolyzed solution W4 was cooled to room temperature, potassium iodide was added thereto, and the electrolyzed solution W4 was stained by reacting the potassium iodide with hypochlorous acid in the electrolyzed solution W4. The electrolyzed solution W4 after staining is referred to as the stained electrolyzed solution W4'.

Figure 4A:
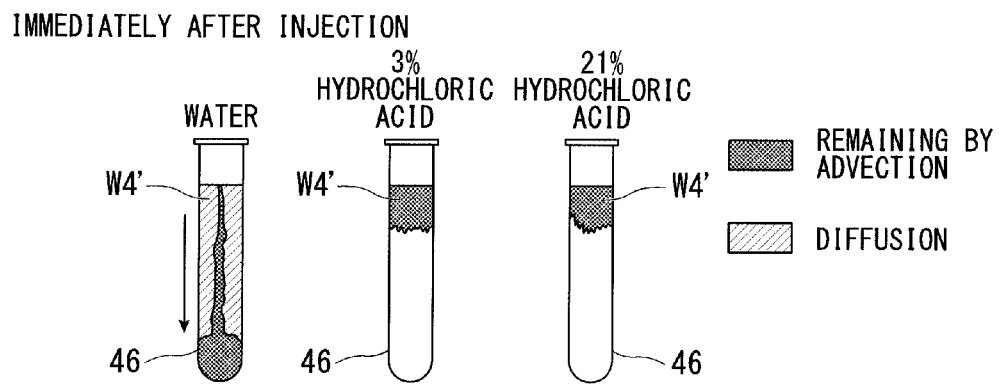
FIG. 4A is a view showing a state immediately after an electrolyzed solution is injected, in a first experiment of electrolyzed solution behavior.
Figure 5A:
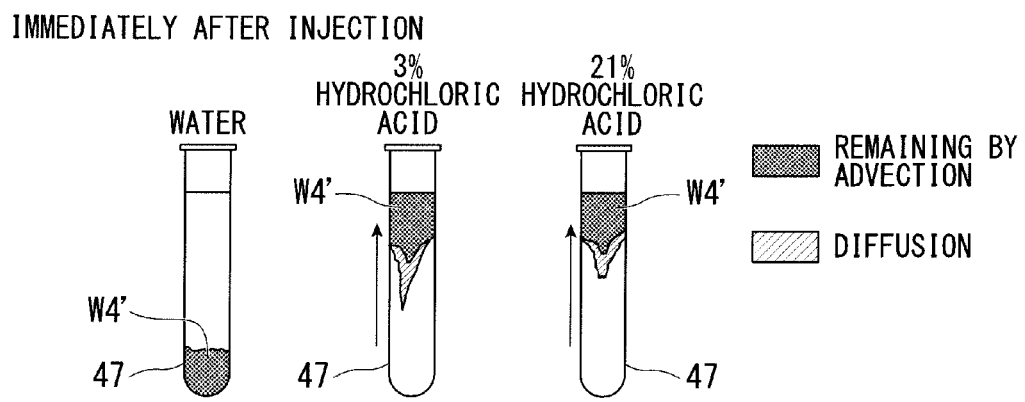
FIG. 5A is a view showing a state immediately after an electrolyzed solution is injected, in a first experiment of electrolyzed solution behavior.

(4) 1 ml of the stained electrolyzed solution W4' was injected into each of the test tubes 46 and 47 of (1). FIGS. 4A and 5A show a state immediately after the stained electrolyzed solution W4' was injected. At this time, as shown in FIG. 4A, in the three test tubes 46 (first set), the stained electrolyzed solution W4' was added (injected) to the surface of the solution from above inside the test tube 46. In addition, as shown in FIG. 5A, in the three test tubes 47 (second set), the stained electrolyzed solution W4' was added to the bottom of the solution inside the test tube 47.

Figure 4B:
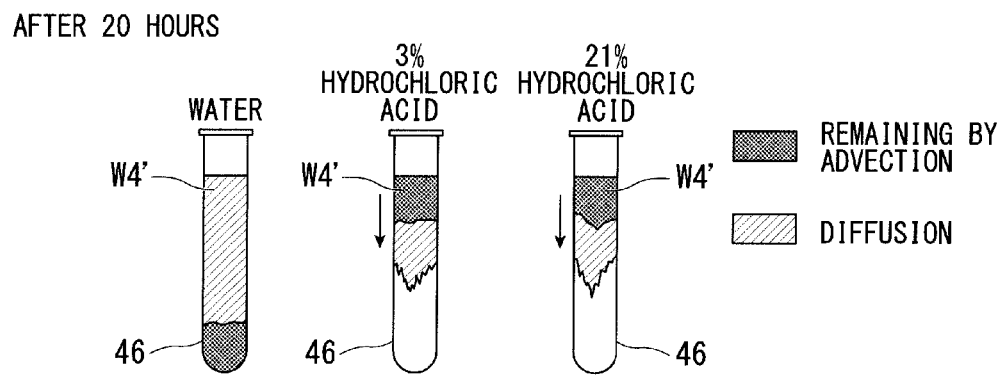
FIG. 4B is a view showing a state after a lapse of 20 hours in the first experiment of electrolyzed solution behavior.
Figure 4C:
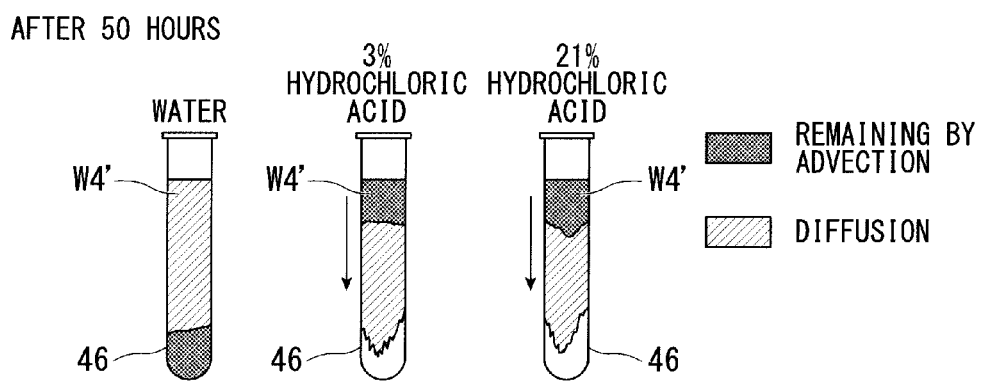
FIG. 4C is a view showing a state after a lapse of 50 hours in the first experiment of electrolyzed solution behavior.
Figure 4D:
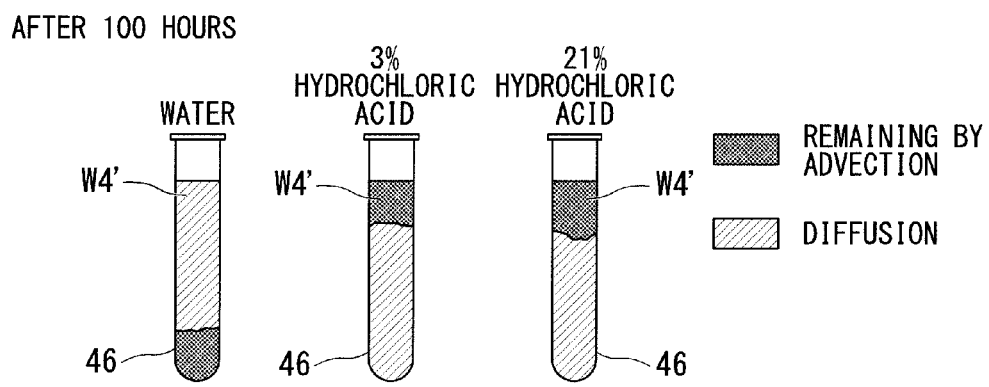
FIG. 4D is a view showing a state after a lapse of 100 hours in the first experiment of electrolyzed solution behavior.
Figure 5B:
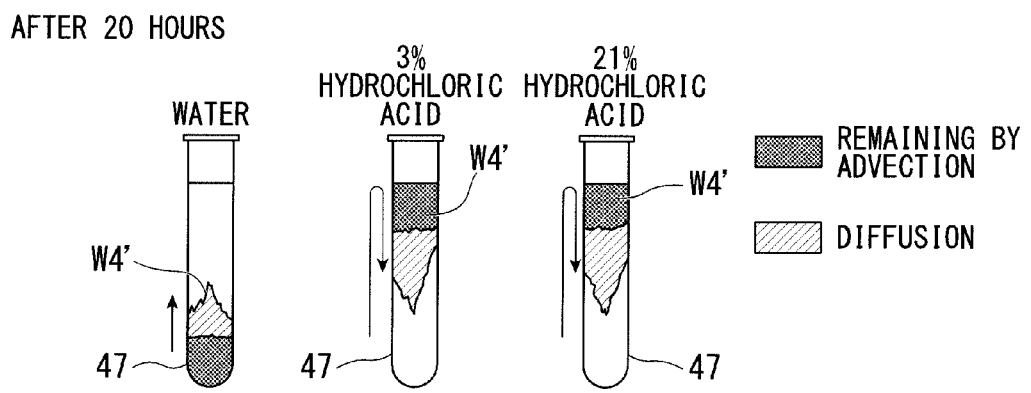
FIG. 5B is a view showing a state after a lapse of 20 hours in the first experiment of electrolyzed solution behavior.
Figure 5C:
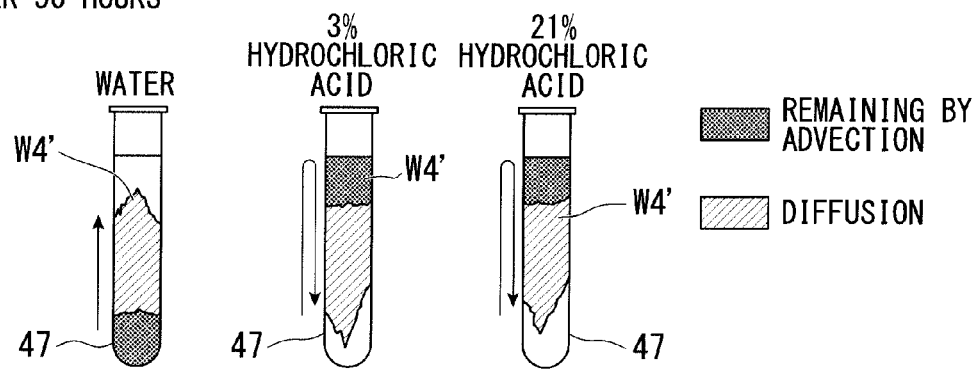
FIG. 5C is a view showing a state after a lapse of 50 hours in the first experiment of electrolyzed solution behavior.
Figure 5D:
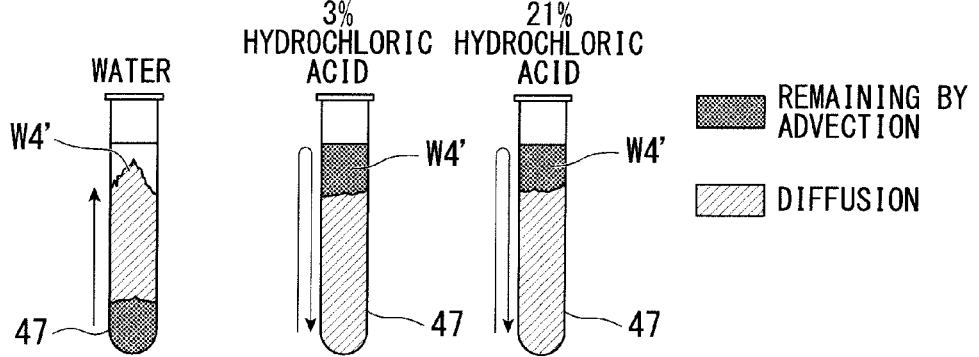
FIG. 5D is a view showing a state after a lapse of 100 hours in the first experiment of electrolyzed solution behavior.

(5) In a state where the test tubes 46 and 47 were allowed to stand still, temporal change of a colored state was observed and recorded after a lapse of 20 hours, 50 hours, or 100 hours from the time the stained electrolyzed solution W4' was injected. FIGS. 4B and 5B show a state after a lapse of 20 hours, FIGS. 4C and 5C show a state after a lapse of 50 hours, and FIGS. 4D and 5D show a state after a lapse of 100 hours.

In the first experiment of electrolyzed solution behavior, as shown in FIGS. 4A to 4D, when the stained electrolyzed solution W4' was added to the surface of water, the electrolyzed solution W4' was advected toward the bottom of the test tube 46 while diffusing, and settled in the bottom. The electrolyzed solution W4' did not completely diffuse immediately after the addition, but diffused in the entire interior of the test tube over time. However, the settling of the advected electrolyzed solution W4' was observed even after a lapse of 100 hours. On the other hand, when the stained electrolyzed solution W4' was added to each surface of 3% hydrochloric acid solution and 21% hydrochloric acid solution, the stained electrolyzed solution W4' was not advected after the addition, but remained near the surface of the solution. In addition, a state was observed in which the electrolyzed solution W4' gradually diffused downward over time.

In addition, as shown in FIGS. 5A to 5D, when the stained electrolyzed solution W4' was added to the bottom of water, the stained electrolyzed solution W4' was not advected after the addition, but remained at the bottom of the test tube 47. A state was confirmed in which the advection did not occur but only the diffusion occurred, and the electrolyzed solution W4' gradually diffused upward over time, but did not diffuse in the entire interior of the test tube even after a lapse of 100 hours. On the other hand, when the stained electrolyzed solution W4' was added to each bottom of 3% hydrochloric acid solution and 21% hydrochloric acid solution, a state was observed in which the stained electrolyzed solution W4' was advected toward the surface of the solution while slightly diffusing after the addition, immediately went up to the surface of the solution through the advection, briefly remained at the surface of the solution, and thereafter diffused downward with the passage of time.

From the above experimental results, it was confirmed that the electrolyzed solution W4' is easily advected downward in water and easily remains at the bottom of water, and the electrolyzed solution W4' is easily advected upward in hydrochloric acid solution and easily remains at the surface of the solution. In addition, it was confirmed that the electrolyzed solution W4' gradually diffused in the entire interior with the passage of time.

As shown in FIGS. 4A to 4D and 5A to 5D, the advection of the electrolyzed solution W4' occurs in the vertical direction due to a difference of densities. Table 1 shows specific gravity of water, hydrochloric acid, and an electrolyzed solution which were used in the experiment. In the hydrochloric acid and the electrolyzed solution shown in Table 1, the specific gravity of the hydrochloric acid is greater than that of the electrolyzed solution without reference to the concentration of the hydrochloric acid. Therefore, the electrolyzed solution W4' in the hydrochloric acid solution showed the behavior (not diffusion, but advection) of going up to the surface of the solution immediately after the addition.

TABLE 1

| | SAMPLING NUMBER | | | | | | STANDARD |
|---|---|---|---|---|---|---|---|
| | 1 | 2 | 3 | 4 | 5 | AVERAGE | DEVIATION |
| WATER | 1.0003 | 0.9968 | 0.9853 | 1.0015 | 0.9907 | 0.9949 | 0.006101 |
| 3% HCl | 0.9989 | 1.0225 | 1.0085 | 1.0086 | 1.0057 | 1.0088 | 0.007687 |
| 21% HCl | 1.0938 | 1.0879 | 1.0889 | 1.0840 | 1.0719 | 1.0853 | 0.007392 |
| ELECTROLYZED SOLUTION | 0.9927 | 0.9810 | 0.9746 | 0.9793 | 0.9803 | 0.9816 | 0.005992 |

DESCENDING ORDER OF SPECIFIC GRAVITY 21% HCl > 3% HCl > WATER > ELECTROLYZED SOLUTION

Between water and the electrolyzed solution W4', the reaction of $H_2O+Cl_2 \rightarrow HClO+HCl$ occurs at a contact region thereof, chlorine gas dissolving in the electrolyzed solution W4' reacts with water, and thus hypochlorous acid molecules are produced. The specific gravity of the reactant (hypochlorous acid water) of water and the electrolyzed solution W4' becomes greater than that of water.

Accordingly, when the electrolyzed solution W4' was added to the surface of water as shown in FIGS. 4A to 4D, chlorine molecules in the electrolyzed solution W4' reacted with water molecules, thereby producing hypochlorous acid molecules, and the coloration associated with the reaction between hypochlorous acid and potassium iodide showed the behavior (advection with diffusion) of settling to the bottom of water.

In addition, when the electrolyzed solution W4' was added to the bottom of water as shown in FIGS. 5A to 5D, chlorine molecules in the electrolyzed solution reacted with water molecules, thereby producing hypochlorous acid molecules, the specific gravity of the reactant became greater than that of water, and therefore the behavior (advection) of remaining at the bottom of water was shown. To be precise, until the chemical equation reaches the equilibrium, the reversible reaction of chlorine gas and hypochlorous acid is repeated.

Next, the second experiment of electrolyzed solution behavior is described with reference to FIGS. 6A to 6F and 7A to 7F. In the second experiment of electrolyzed solution behavior, the experiment was carried out in accordance with a procedure shown in the following (1) to (8).

(1) A PFA tube (fluorine resin tube) was heated using a burner, and was formed into a U-shape having a height of 150 mm. Water or 3% hydrochloric acid solution was filled (injected) thereinto.

(2) One end of the PFA tube filled with water or 3% hydrochloric acid solution was melted using a burner, thereby sealing the one end.

(3) 3% hydrochloric acid solution was used as the electrolyte solution W3, the electrolysis water-making apparatus A was continuously operated for 3 hours after the electrolyte solution W3 was supplied into the electrolytic cell 2, and the electrolyzed solution W4 was obtained from the electrolytic cell 2 after the continuous operation. In the obtained electrolyzed solution W4, the available chlorine concentration thereof was 265.5 ppm.

(4) After the obtained electrolyzed solution W4 was cooled to room temperature, potassium iodide was added thereto, and the electrolyzed solution W4 was stained by reacting the potassium iodide with hypochlorous acid in the electrolyzed solution W4. The electrolyzed solution W4 after staining is referred to as the stained electrolyzed solution W4'.

(5) 300 μl of the stained electrolyzed solution W4' was injected through the other end thereof into each PFA tube sealed at the one end.

(6) In the PFA tube filled with water, the other end through which the electrolyzed solution W4' was injected was sealed using a parafilm. On the other hand, in the PFA tube filled with 3% hydrochloric acid solution, the other end thereof was melted and sealed using a burner. In addition, in the tube filled with water, since the electrolyzed solution W4' rises if the sealing is performed through heating and melting by a burner, the other end was sealed using a parafilm.

Figure 6A:
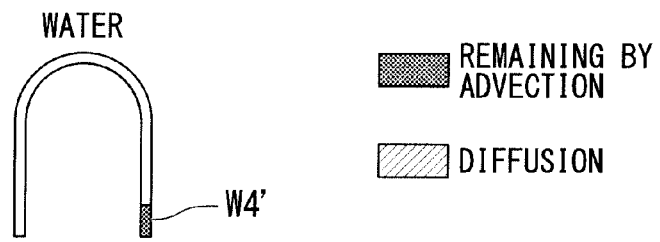
FIG. 6A is a view showing a state immediately after an electrolyzed solution is injected, in a second experiment of electrolyzed solution behavior.
Figure 6B:
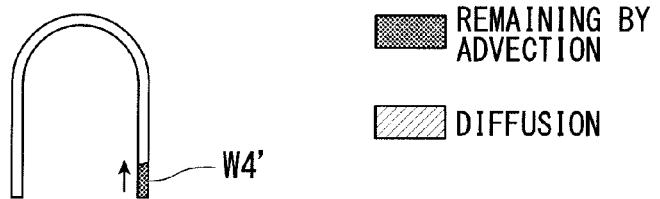
FIG. 6B is a view showing a state after a lapse of 20 hours in the second experiment of electrolyzed solution behavior.
Figure 6C:
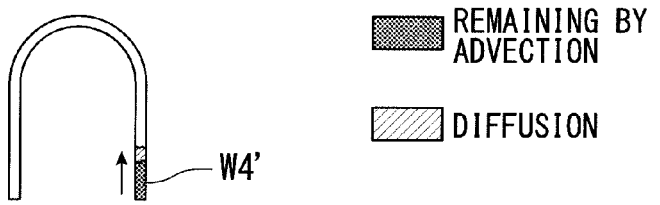
FIG. 6C is a view showing a state after a lapse of 50 hours in the second experiment of electrolyzed solution behavior.
Figure 6D:
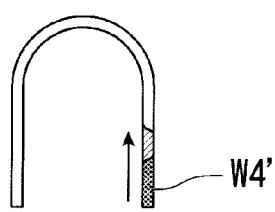
FIG. 6D is a view showing a state after a lapse of 70 hours in the second experiment of electrolyzed solution behavior.
Figure 6D:
Figure 6D:
Figure 6E:
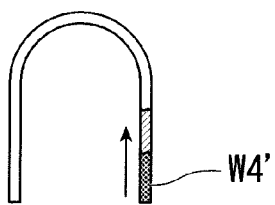
FIG. 6E is a view showing a state after a lapse of 100 hours in the second experiment of electrolyzed solution behavior.
Figure 6E:
Figure 6E:
Figure 6F:
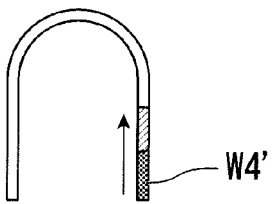
FIG. 6F is a view showing a state after a lapse of 200 hours in the second experiment of electrolyzed solution behavior.
Figure 6F:
Figure 6F:
Figure 7A:
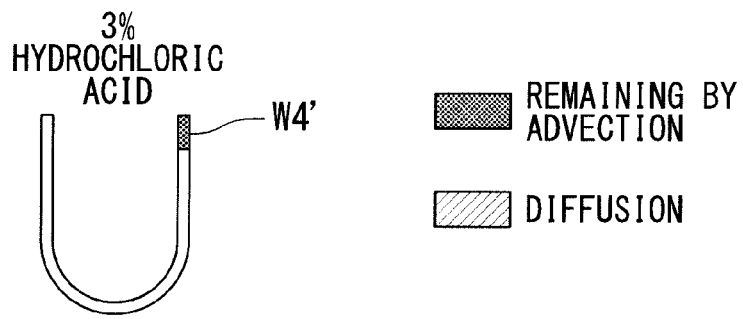
FIG. 7A is a view showing a state immediately after an electrolyzed solution is injected, in a second experiment of electrolyzed solution behavior.

(7) The tube filled with water was allowed to stand still in a state of an inverted U-shape as shown in FIGS. 6A to 6F, and the tube filled with 3% hydrochloric acid solution was allowed to stand still in a state of a U-shape as shown in FIGS. 7A to 7F. This is based on the results of the first experiment of electrolyzed solution behavior. FIGS. 6A and 7A show a state immediately after the stained electrolyzed solution W4' was injected.

Figure 7B:
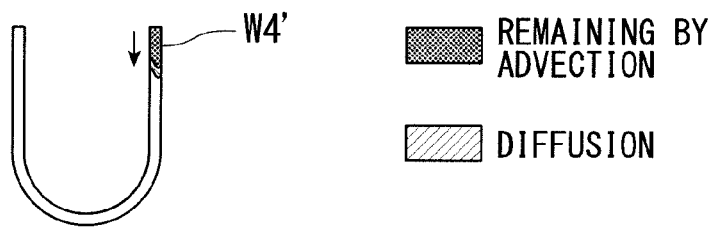
FIG. 7B is a view showing a state after a lapse of 20 hours in the second experiment of electrolyzed solution behavior.
Figure 7C:
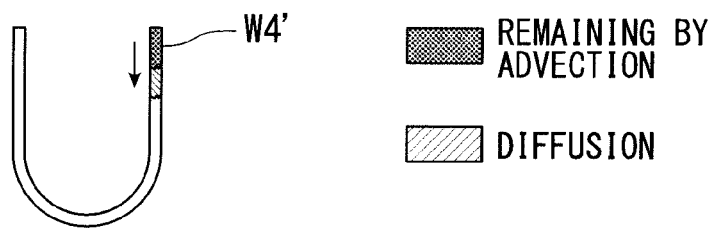
FIG. 7C is a view showing a state after a lapse of 50 hours in the second experiment of electrolyzed solution behavior.
Figure 7D:
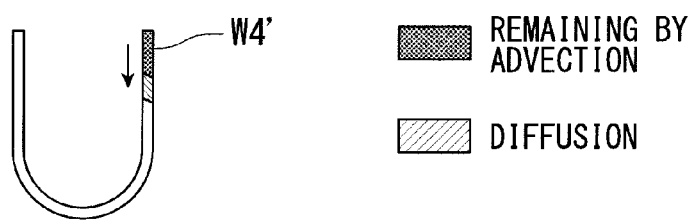
FIG. 7D is a view showing a state after a lapse of 70 hours in the second experiment of electrolyzed solution behavior.
Figure 7E:
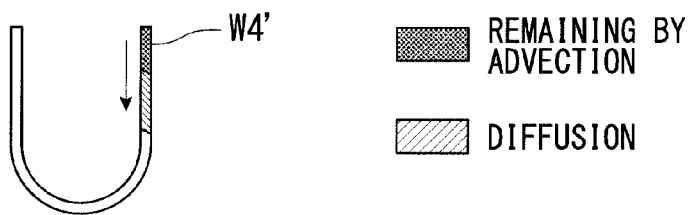
FIG. 7E is a view showing a state after a lapse of 100 hours in the second experiment of electrolyzed solution behavior.
Figure 7F:
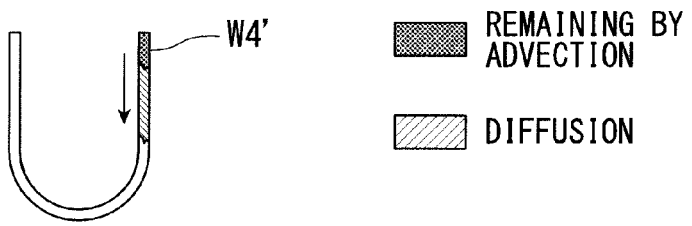
FIG. 7F is a view showing a state after a lapse of 200 hours in the second experiment of electrolyzed solution behavior.

(8) Temporal change of a colored state was observed and recorded after a lapse of 20 hours, 50 hours, 70 hours, 100 hours, or 200 hours from the time the stained electrolyzed solution W4' was injected. FIGS. 6B and 7B show a state after a lapse of 20 hours, FIGS. 6C and 7C show a state after a lapse of 50 hours, FIGS. 6D and 7D show a state after a lapse of 70 hours, FIGS. 6E and 7E show a state after a lapse of 100 hours, and FIGS. 6F and 7F show a state after a lapse of 200 hours.

In the second experiment of electrolyzed solution behavior, in a case where water was filled thereinto, as shown in FIGS. 6A to 6F, the stained electrolyzed solution W4' added to the other end (lower end) remained at the lower part, and the advection did not occur but the diffusion only occurred. A state was observed in which the electrolyzed solution W4' gradually diffused upward over time, but did not reach the top of the tube of inversed U-shape even after a lapse of 200 hours.

On the other hand, in a case where 3% hydrochloric acid solution was filled thereinto, as shown in FIGS. 7A to 7F, the stained electrolyzed solution W4' added to the other end (upper end) remained at the upper part, and the advection did not occur but the diffusion only occurred. A state was observed in which the electrolyzed solution W4' gradually diffused downward over time, but did not reach the bottom of the tube of U-shape even after a lapse of 200 hours.

That is, the results of the second experiment of electrolyzed solution behavior were similar to the behavior of the electrolyzed solution in the first experiment of electrolyzed solution behavior.

According to the results of the first and second experiments of electrolyzed solution behavior, it is estimated that if the raw material solution feed pump 3 is disposed above the electrolytic cell 2, the electrolyzed solution W4 is advected from the electrolytic cell 2 into the electrolyte solution W3 (hydrochloric acid solution) in the tube 32 immediately after the operation stop. If the electrolyzed solution W4 is advected into the tube 32, the corrosion of component parts such as the tube 32 may occur.

In addition, according to the results of the first and second experiments of electrolyzed solution behavior, it is estimated that if the dilution water pump 4 is disposed below the electrolytic cell 2, the electrolyzed solution W4 is advected from the electrolytic cell 2 into water in the tube 34 immediately after the operation stop. If the electrolyzed solution W4 is advected into the tube 34, the corrosion of component parts such as the tube 34 may occur.

From the results of the first and second experiments of electrolyzed solution behavior, it was clarified that effect in which the cause thereof was unknown in the related art was caused by the advection of the electrolyzed solution W4, wherein the effect includes the occurrence of deterioration such as discoloration or swelling of the tube 32 or 34 connecting the outlet 3b of the raw material solution feed pump 3 or the outlet 4b of the dilution water pump 4 to the inlet 26 of the electrolytic cell 2, and the occurrence of obstruction of the tube 32 or 34 by scrapings peeled off an inner wall of the tube 32 or 34. Furthermore, it was clarified that the advection of the electrolyzed solution W4 occurs in a case where the raw material solution feed pump 3 is disposed above the electrolytic cell 2, or in a case where the dilution water pump 4 is disposed below the electrolytic cell 2.

Figure 8A:
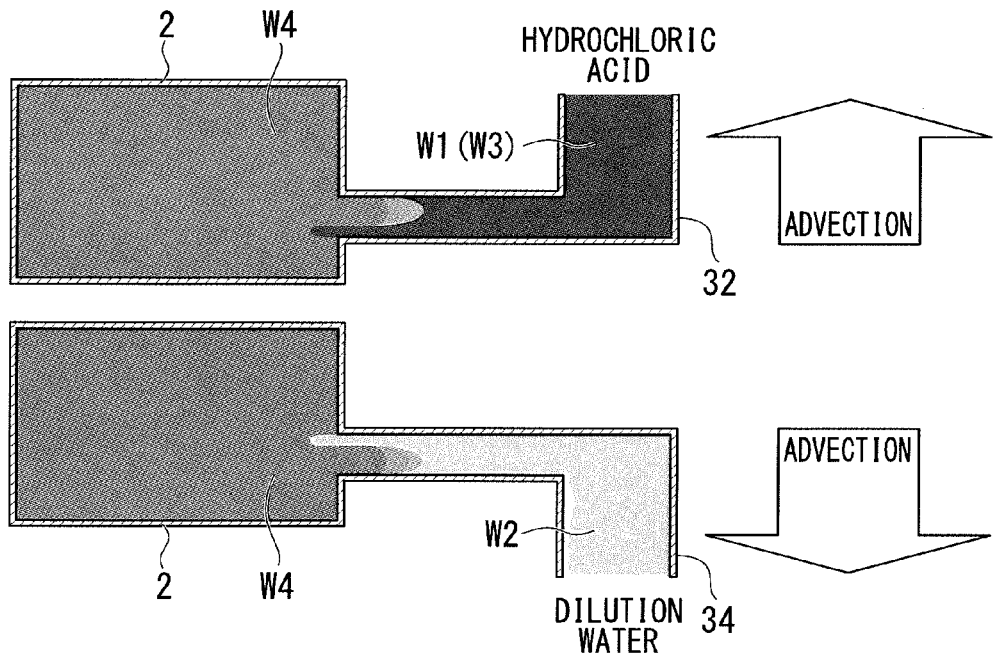
FIG. 8A is a principle diagram explaining a state of mutual advection of an electrolyzed solution, a raw material solution, and dilution water when the operation of an electrolytic cell is stopped.
Figure 8B:
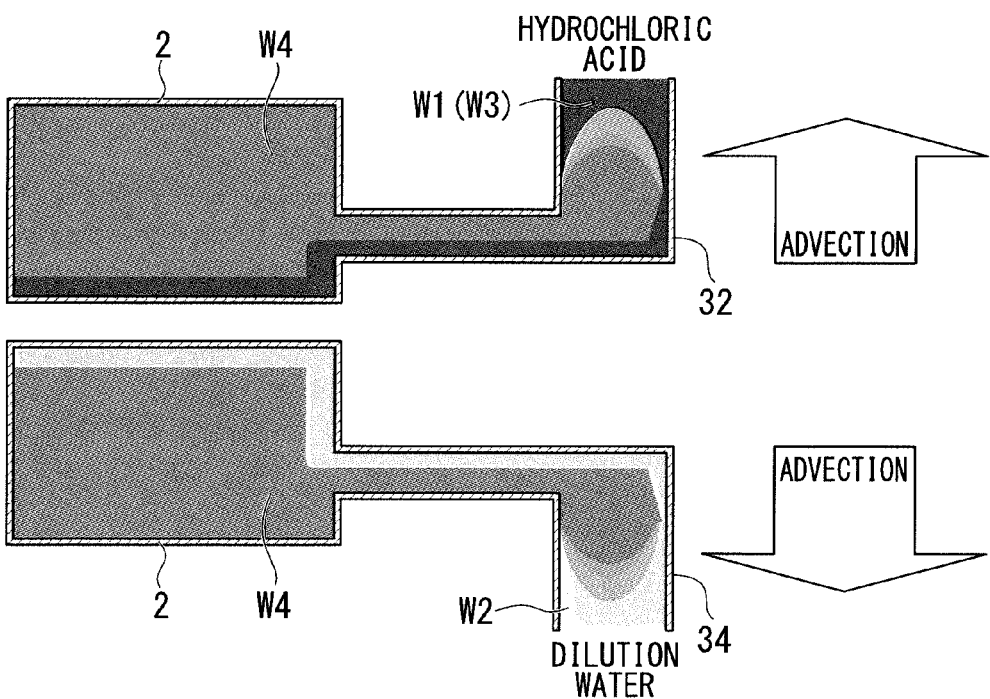
FIG. 8B is a principle diagram explaining a state of mutual advection of an electrolyzed solution, a raw material solution, and dilution water when the operation of an electrolytic cell is stopped.

On the other hand, it was found that the advection of the electrolyzed solution W4 may cause another unfavorable situation. FIG. 8A shows a state immediately after the operation of the electrolytic cell 2 is stopped, and FIG. 8B shows a state where the advection of the electrolyzed solution W4 from the electrolytic cell 2 to the tubes 32 and 34 has advanced. As shown in FIG. 8A, when the operation of the electrolytic cell 2 is stopped, as described above, the electrolyzed solution W4 remaining in the electrolytic cell 2 starts being advected toward the raw material solution pipe 32 or the dilution water pipe 34. However, during stoppage of the electrolysis water-making apparatus A, the raw material solution pipe 32 and the dilution water pipe 34 are checked by a non-return mechanism (not shown), and thus the pipes 32 and 34 are in an obstructed state. Therefore, if the electrolyzed solution W4 is advected from the electrolytic cell 2 into the pipes 32 and 34, as shown in FIG. 8B, in an opposite manner, the raw material solution W3 (W1) is advected from the raw material solution pipe 32 into the electrolytic cell 2, and the dilution water W2 is advected from the dilution water pipe 34 into the electrolytic cell 2.

The raw material solution W3 advected into the electrolytic cell 2 remains at the lower part inside the electrolytic cell 2, and the dilution water W2 remains at the upper part inside the electrolytic cell 2. Since the raw material solution W3 has a high chlorine ion concentration, inside the electrolytic cell 2, the lower part has a high chlorine ion concentration, and the upper part has a low chlorine ion concentration. That is, the skewed distribution of chlorine ion concentration occurs inside the electrolytic cell 2 in the up-and-down direction. Overcurrent may occur due to the skewed distribution of chlorine ion concentration when the operation of the electrolytic cell 2 is restarted, and thus an error stop state of the electrolysis water-making apparatus may be caused.

As described above, the inventor ascertained, from the results of the first and second experiments of electrolyzed solution behavior, that the advection of the electrolyzed solution W4 causes the deterioration of components of the raw material solution feed pump 3 or the dilution water pump 4, the deterioration of the connection tubes 32 and 34, the obstruction of the tubes 32 and 34, or the like, and that the advection of the raw material solution W3 or the dilution water W2 associated with the advection of the electrolyzed solution W4 causes the error stop state at the time the operation of the electrolysis water-making apparatus in a halt state is restarted.

In addition, the diffusion occurs without reference to the occurrence of the advection. That is, although there are different situations, i.e., the diffusion occurs at the same time as the advection or the diffusion only occurs, the diffusion occurs without reference to occurrence or non-occurrence of the advection. However, the mass transfer rate in diffusion is low, and the electrolyzed solution W4 is diluted with the undiluted solution W1, the dilution water W2, or the electrolyte solution W3. Therefore, the extent of impact which the diffusion has on the electrolysis water-making apparatus is less compared to the advection.

In this embodiment, the U-shaped part 41 and the inverted U-shaped part 42 are formed between the one end 32a and the other end 32b, and the electrolyzed solution advection-deterring portion 40 configured so that a part thereof near the other end 32b is disposed on the upper side of another part thereof near the one end 32a is formed in the raw material solution tube 32 using the U-shaped part 41 and the inverted U-shaped part 42. In more detail, the electrolyzed solution advection-deterring portion 40 includes the downward slope pipeline 32c sloping downward as it approaches from the other end 32b toward the one end 32a.

When the electrolyzed solution W4 is advected toward the raw material solution tube 32 from the other end 32b connected to the inlet 26 of the electrolytic cell 2, the electrolyzed solution W4 flows through the raw material solution tube 32 in the direction of an arrow X, and reaches the inverted U-shaped part 42 (refer to FIG. 3). However, in the position beyond that, the downward slope pipeline 32c is provided. Since the downward slope pipeline 32c forms a pipeline downward, the electrolyzed solution W4 cannot further advance. Thus, a further flow of the electrolyzed solution W4 toward the one end 32a of the raw material solution tube 32 is prevented by the downward slope pipeline 32c.

On the other hand, the inverted U-shaped part 43 and the U-shaped part 44 are formed between the one end 34a and the other end 34b, and the second electrolyzed solution advection-deterring portion 45 configured so that a part thereof near the other end 34b is disposed on the lower side of another part thereof near the one end 34a is formed in the dilution water tube 34 using the inverted U-shaped part 43 and the U-shaped part 44. In more detail, the second electrolyzed solution advection-deterring portion 45 includes the upward slope pipeline 34c sloping upward as it approaches from the other end 34b toward the one end 34a.

When the electrolyzed solution W4 is advected toward the dilution water tube 34 from the other end 34b connected to the inlet 26 of the electrolytic cell 2, the electrolyzed solution W4 flows through the dilution water tube 34 in the direction of an arrow Y, and reaches the U-shaped part 44 (refer to FIG. 3). However, in the position beyond that, the upward slope pipeline 34c is provided. Since the upward slope pipeline 34c forms a pipeline upward, the electrolyzed solution W4 cannot further advance. Thus, a further flow of the electrolyzed solution W4 toward the one end 34a of the dilution water tube 34 is prevented by the upward slope pipeline 34c.

As described above, the inventor clarified the cause of the phenomenon in which the electrolyzed solution W4 intrudes from the electrolytic cell 2 into the raw material solution tube 32 after the operation stop of the electrolysis water-making apparatus A in spite of preventing the flowback of the electrolyzed solution W4 in the electrolytic cell 2 using a non-return mechanism. Based on this, in the electrolysis water-making apparatus A of this embodiment, the raw material solution tube 32 is arranged so as to form the electrolyzed solution advection-deterring portion 40 which is configured so that a part thereof near the other end 32b is disposed on the upper side of another part thereof near the one end 32a. Therefore, even if the raw material solution feed pump 3 is provided so that the outlet 3b of the raw material solution feed pump 3 is disposed on the upper side of the inlet 26 of the electrolytic cell 2, the electrolyzed solution W4 can be prevented from intruding from the electrolytic cell 2 into the raw material solution tube 32 connected to the raw material solution feed pump 3 immediately after the operation stop.

As a result, the corrosion of component parts due to the electrolyzed solution W4 can be prevented, and it is possible to extend the lives of the component parts. In addition, it is possible to decrease the frequency of replacement of the component parts, and to provide the electrolysis water-making apparatus A having excellent durability, economic efficiency, and reliability.

In addition, based on the cause of the above phenomenon clarified by the inventor, the dilution water tube 34 is arranged so as to form the second electrolyzed solution advection-deterring portion 45 which is configured so that a part thereof near the other end 34b is disposed on the lower side of another part thereof near the one end 34a. Therefore, even if the dilution water pump 4 is provided so that the outlet 4b of the dilution water pump 4 is disposed on the lower side of the inlet 26 of the electrolytic cell 2, the electrolyzed solution W4 can be prevented from intruding from the electrolytic cell 2 into the dilution water tube 34 connected to the dilution water pump 4 immediately after the operation stop.

As a result, the corrosion of component parts due to the electrolyzed solution W4 can be prevented, and it is possible to further extend the lives of the component parts. In addition, it is possible to decrease the frequency of replacement of the component parts, and to provide the electrolysis water-making apparatus A having further excellent durability, economic efficiency, and reliability.

In addition, the fixing means are provided which fix the raw material solution tube 32 and the dilution water tube 34 in a state where the electrolyzed solution advection-deterring portions 40 and 45 are formed. Therefore, it is possible to hold the raw material solution tube 32 and the dilution water tube 34 in a state where the electrolyzed solution advection-deterring portions 40 and 45 are formed, and to prevent the electrolyzed solution W4 from intruding from the electrolytic cell 2 into the tube 32 or 34 connected to the raw material solution feed pump 3 or the dilution water pump 4.

Furthermore, in the electrolysis water-making apparatus A of this embodiment, the electrolyzed solution advection-deterring portion 40 is formed to include the U-shaped part 41 and the inverted U-shaped part 42 in series as it approaches from the one end 32a toward the other end 32b of the raw material solution tube 32, wherein the U-shaped part 41 and the inverted U-shaped part 42 curve around the central axes O2 and O3 extending in the lateral direction (the horizontal direction), respectively. In addition, the electrolyzed solution advection-deterring portion 45 is formed to include the inverted U-shaped part 43 and the U-shaped part 44 in series as it approaches from the one end 34a toward the other end 34b of the dilution water tube 34, wherein the inverted U-shaped part 43 and the U-shaped part 44 curve around the central axes O4 and O5 extending the lateral direction (the horizontal direction), respectively. Therefore, in the raw material solution tube 32, it is possible to reliably and easily form the electrolyzed solution advection-deterring portion 40 which is configured so that a part thereof near the other end 32b is disposed on the upper side of another part thereof near the one end 32. In addition, in the dilution water tube 34, it is possible to reliably and easily form the second electrolyzed solution advection-deterring portion 45 which is configured so that a part thereof near the other end 34b is disposed on the lower side of another part thereof near the one end 34a.

In the electrolysis water-making apparatus A of this embodiment, since it is possible to prevent the advection of the electrolyzed solution W4 from the electrolytic cell 2 toward the raw material solution tube 32 or toward the dilution water tube 34, it is possible to prevent the advection of the raw material solution W3 or of the dilution water W2 from the raw material solution tube 32 or from the dilution water tube 34 into the electrolytic cell 2 at the same time. Therefore, the raw material solution W3 or the dilution water W2 does not intrude into the electrolytic cell 2 during stoppage of the electrolysis water-making apparatus A, and thus it is possible to prevent the phenomenon in which the skewed distribution of a chlorine ion occurs inside the electrolytic cell 2 in the up-and-down direction. Accordingly, the error stop state of the apparatus due to the occurrence of overcurrent at the time the operation of the electrolysis water-making apparatus A in a halt state is restarted can be prevented. As a result, it is possible to provide the electrolysis water-making apparatus A capable of more stably operating than that in the related art.

Hereinbefore, the first embodiment of the electrolysis water-making apparatus related to the present invention has been described. However, the present invention is not limited to the above-described first embodiment, and the configuration can be appropriately modified within the scope of the present invention.

For example, in this embodiment, the raw material solution feed pump 3 and the dilution water pump 4 used to supply the undiluted solution W1 and the dilution water W2 respectively are tube pumps, but another type of a pump may be employed as the raw material solution feed pump 3 or the dilution water pump 4. The electrolysis water-making apparatus A may be configured so that a check valve is provided in each of the tubes 32 and 34 connecting the outlets 3b and 4b of the pumps 3 and 4 to the inlet 26 of the electrolytic cell 2. Even in this case, by arranging the raw material solution feed pump 3 and the dilution water pump 4 into a positional relationship similar to this embodiment with respect to the electrolytic cell 2, it is possible to obtain the same operations and effects as that of this embodiment.

In this case, since the check valves are also component parts of the electrolysis water-making apparatus A, it is not preferable that the check valves contact the electrolyzed solution W4. Accordingly, in this case, it is preferable that the electrolyzed solution advection-deterring portions 40 and 45 be provided between the electrolytic cell 2 and the check valves. If adopting such an arrangement, the electrolyzed solution advection-deterring portions 40 and 45 prevent the advection of the electrolyzed solution W4 from the electrolytic cell 2, and thus the electrolyzed solution W4 can be prevented from contacting the check valves.

In this embodiment, the electrolyzed solution advection-deterring portion 40 is formed to include the U-shaped part 41 and the inverted U-shaped part 42 in series as it approaches from the one end 32a toward the other end 32b of the raw material solution tube 32, wherein the U-shaped part 41 and the inverted U-shaped part 42 curve around the central axes O2 and O3 extending the lateral direction (the horizontal direction), respectively. In addition, the electrolyzed solution advection-deterring portion 45 is formed to include the inverted U-shaped part 43 and the U-shaped part 44 in series as it approaches from the one end 34a toward the other end 34b of the dilution water tube 34, wherein the inverted U-shaped part 43 and the U-shaped part 44 curve around the central axes O4 and O5 extending the lateral direction (the horizontal direction), respectively.

Figure 9:
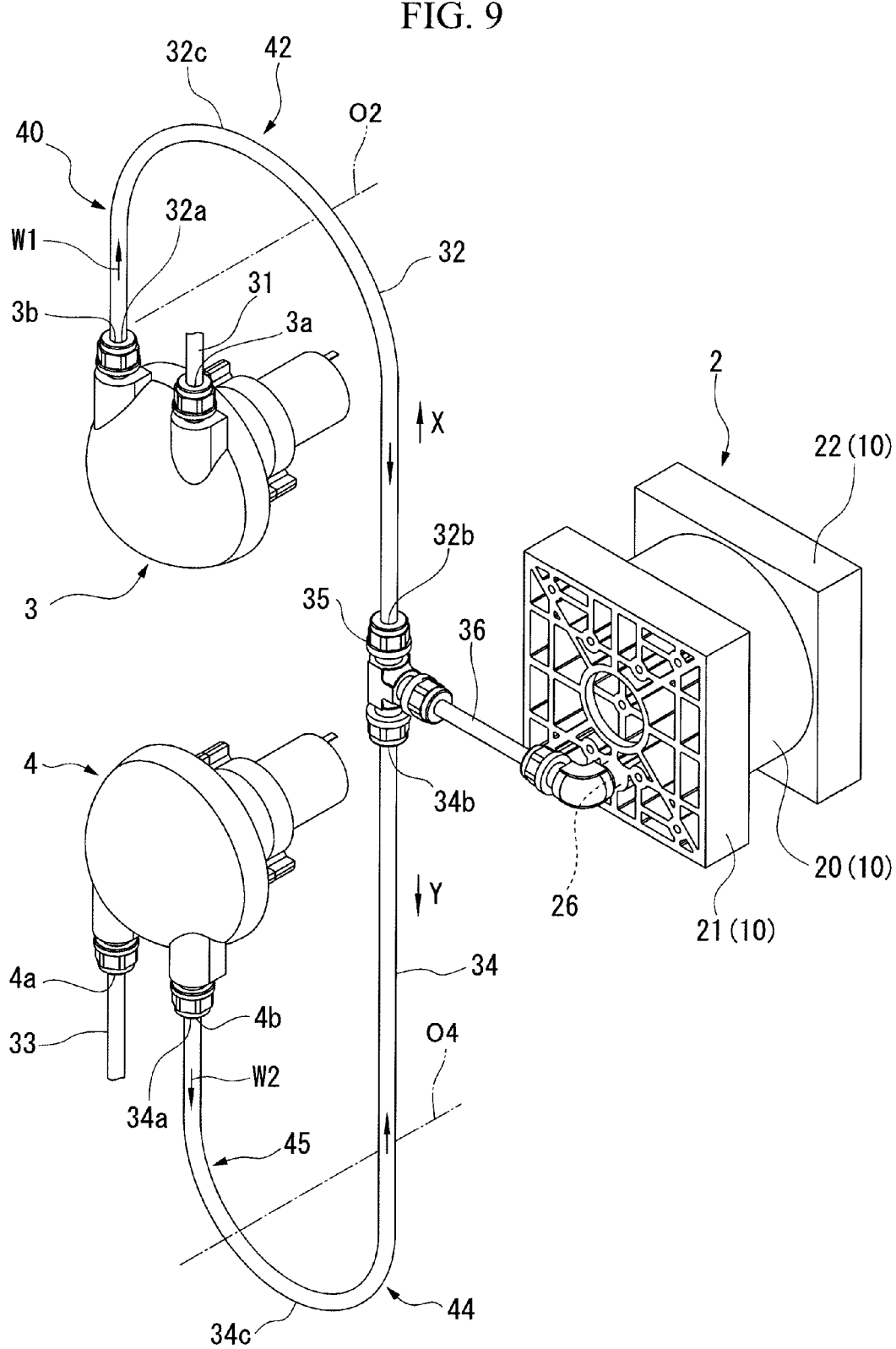
FIG. 9 is a perspective view showing a modification of the electrolysis water-making apparatus related to the first embodiment of the present invention.

On the other hand, as shown in FIG. 9, a configuration may be adopted in which the raw material solution tube 32, as it approaches toward the other end 32b from the one end 32a connected to the outlet 3b of the raw material solution feed pump 3, extends upward from the one end 32a, and then extends downward after curving around the axis O2 extending in the lateral direction (the horizontal direction), and the other end 32b is connected to the inlet 26 of the electrolytic cell 2. The electrolyzed solution advection-deterring portion 40 may be formed using the inverted U-shaped part 42 formed by arranging the raw material solution tube 32 like this. In this case, the downward slope pipeline 32c is formed of a part extending upward from the one end 32a in the raw material solution tube 32.

Even in this case, when the electrolyzed solution W4 which flows through the raw material solution tube 32 in the direction of the arrow X from the other end 32b connected to the inlet 26 of the electrolytic cell 2 reaches the downward slope pipeline 32c, the electrolyzed solution W4 cannot further advance because the pipeline extends downward. Therefore, it is possible to prevent the electrolyzed solution W4 from further flowing toward the one end 32a of the raw material solution tube 32, and thus to obtain the same operations and effects as that of this embodiment.

In addition, as shown in FIG. 9, a configuration may be adopted in which the dilution water tube 34, as it approaches toward the other end 34b from the one end 34a connected to the outlet 4b of the dilution water pump 4, extends downward from the one end 34a, and then extends upward after curving around the central axis O4 extending in the lateral direction (the horizontal direction), and the other end 34b is connected to the inlet 26 of the electrolytic cell 2. The second electrolyzed solution advection-deterring portion 45 may be formed using the U-shaped part 44 formed by arranging the dilution water tube 34 like this. In this case, the upward slope pipeline 34c is formed of a part extending downward from the one end 34a in the dilution water tube 34.

Even in this case, when the electrolyzed solution W4 which flows through the dilution water tube 34 in the direction of the arrow Y from the other end 34b connected to the inlet 26 of the electrolytic cell 2 reaches the upward slope pipeline 34c, the electrolyzed solution W4 cannot further advance because the pipeline extends upward. Therefore, it is possible to prevent the electrolyzed solution W4 from further flowing toward the one end 34a of the dilution water tube 34, and thus to obtain the same operations and effects as that of this embodiment.

In this embodiment, as shown in FIGS. 1 and 3, the electrolysis water-making apparatus A is configured so that the raw material solution tube 32 and the dilution water tube 34 are connected through the T-fitting 35, the dilution water W2 supplied by the dilution water pump 4 is mixed in the undiluted solution W1 supplied by the raw material solution feed pump 3 at the T-fitting 35, thereby producing the electrolyte solution W3 having a predetermined concentration, and the produced electrolyte solution W3 is let to flow into the electrolytic cell 2.

Figure 10:
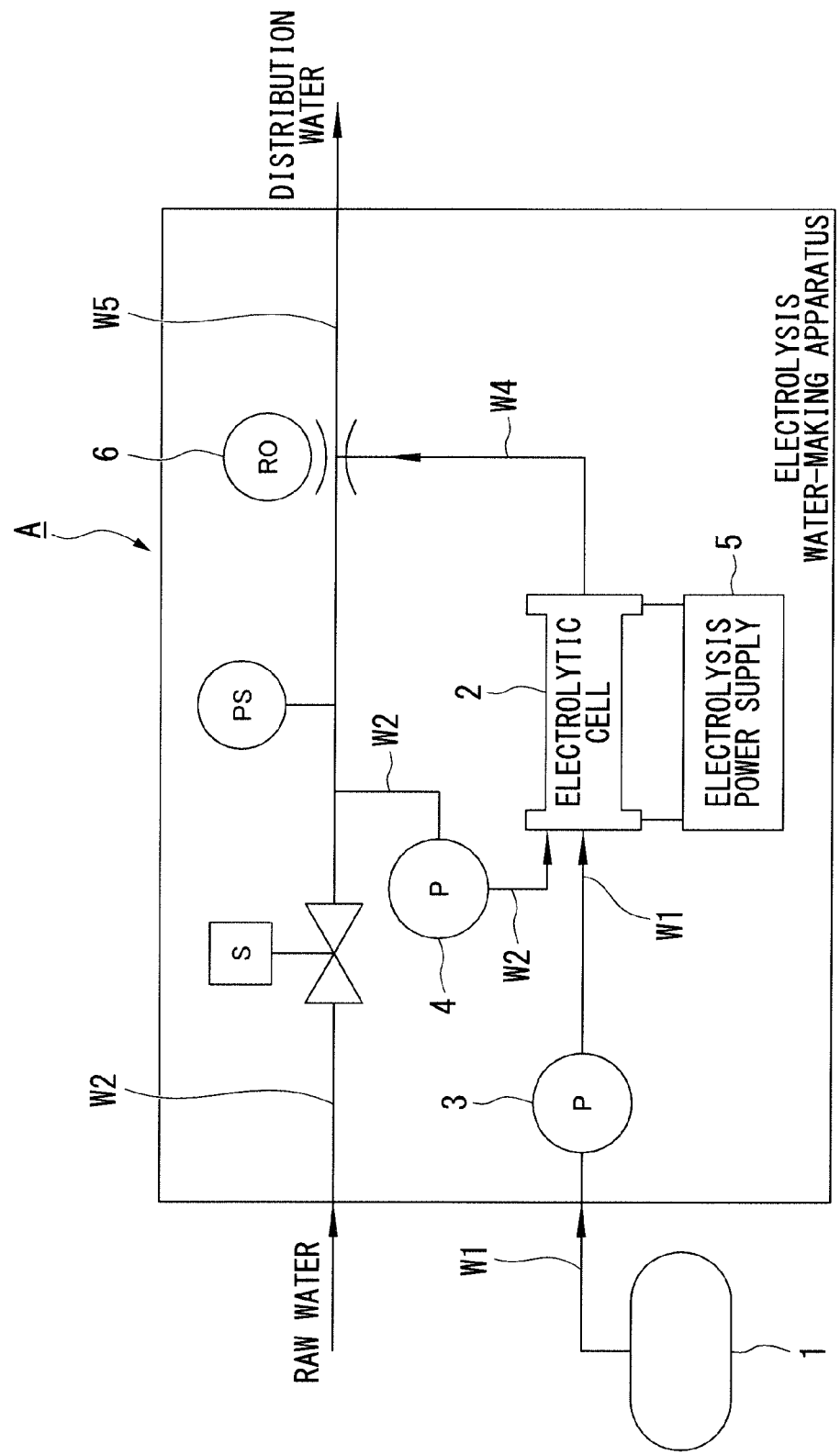
FIG. 10 is a diagram showing a modification of the electrolysis water-making apparatus related to the first to fourth embodiments of the present invention.
Figure 11:
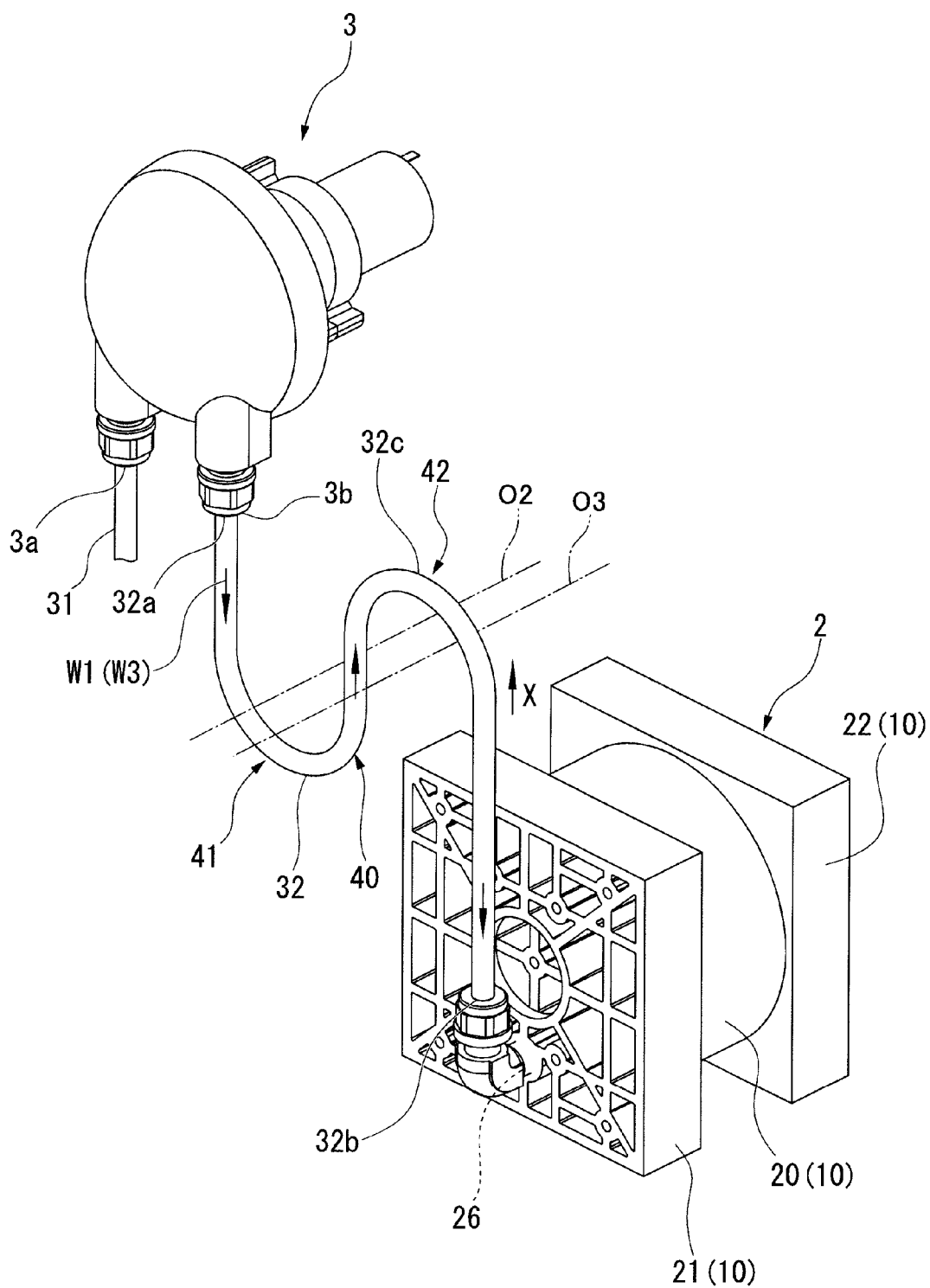
FIG. 11 is a perspective view showing a modification of the electrolysis water-making apparatus related to the first embodiment of the present invention, and is a view showing an electrolyzed solution advection-deterring portion of a raw material solution tube (raw material solution pipe).
Figure 12:
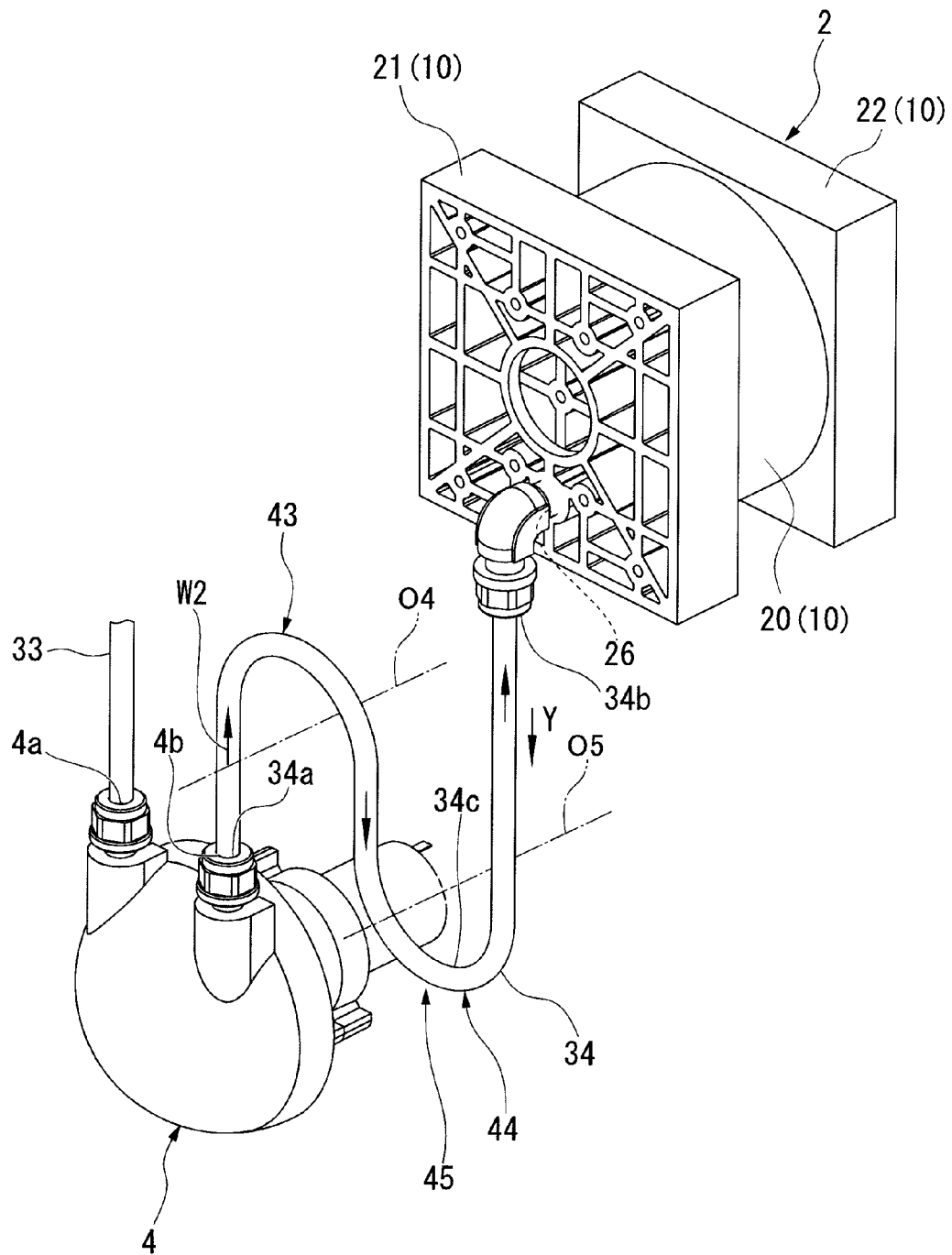
FIG. 12 is a perspective view showing a modification of the electrolysis water-making apparatus related to the first embodiment of the present invention, and is a view showing an electrolyzed solution advection-deterring portion of a dilution water tube (dilution water pipe).

On the other hand, as shown in FIGS. 10, 11 and 12, the electrolysis water-making apparatus A may be configured so that each of the raw material solution feed pump 3 and the dilution water pump 4 is individually connected to the electrolytic cell 2, the undiluted solution W1 supplied from the raw material solution feed pump 3 and the dilution water W2 supplied from the dilution water pump 4 are mixed together inside the electrolytic cell 2, and the electrolyte solution W3 having a predetermined concentration is let to flow in the electrolytic cell 2.

Figure 13:
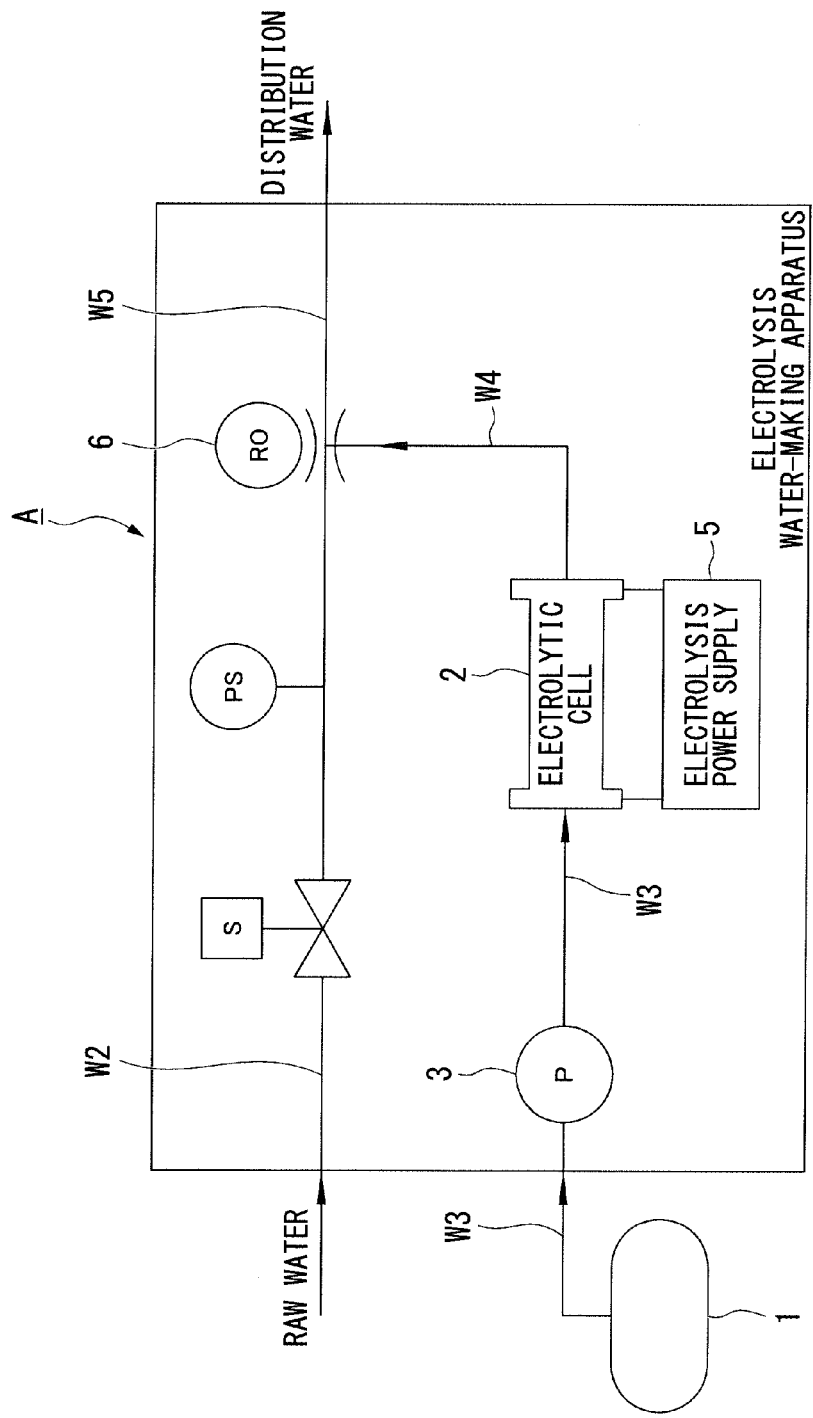
FIG. 13 is a diagram showing a modification of the electrolysis water-making apparatus related to the first to fourth embodiments of the present invention.

In addition, as shown in FIG. 13 (and FIG. 11), the electrolysis water-making apparatus A may be configured so that the electrolyte solution W3 which has been adjusted to have a predetermined concentration by mixing the undiluted solution W1 and the dilution water W2 beforehand is supplied into the electrolytic cell 2 by the raw material solution feed pump 3. That is, the dilution water pump 4 may not be provided therein.

Figure 14:
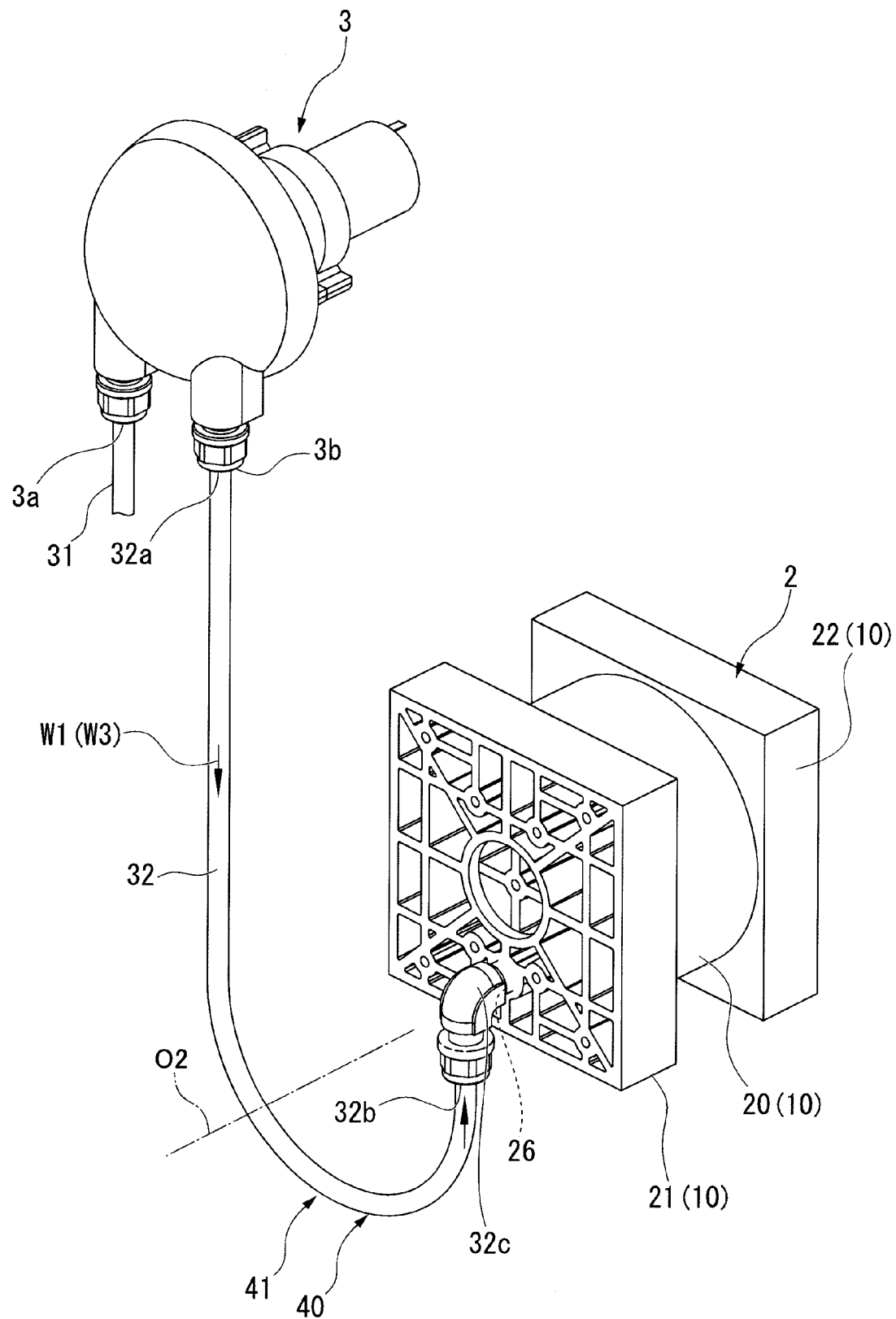
FIG. 14 is a perspective view showing a modification of the electrolysis water-making apparatus related to the first embodiment of the present invention, and is a view showing an electrolyzed solution advection-deterring portion of a raw material solution tube.
Figure 15:
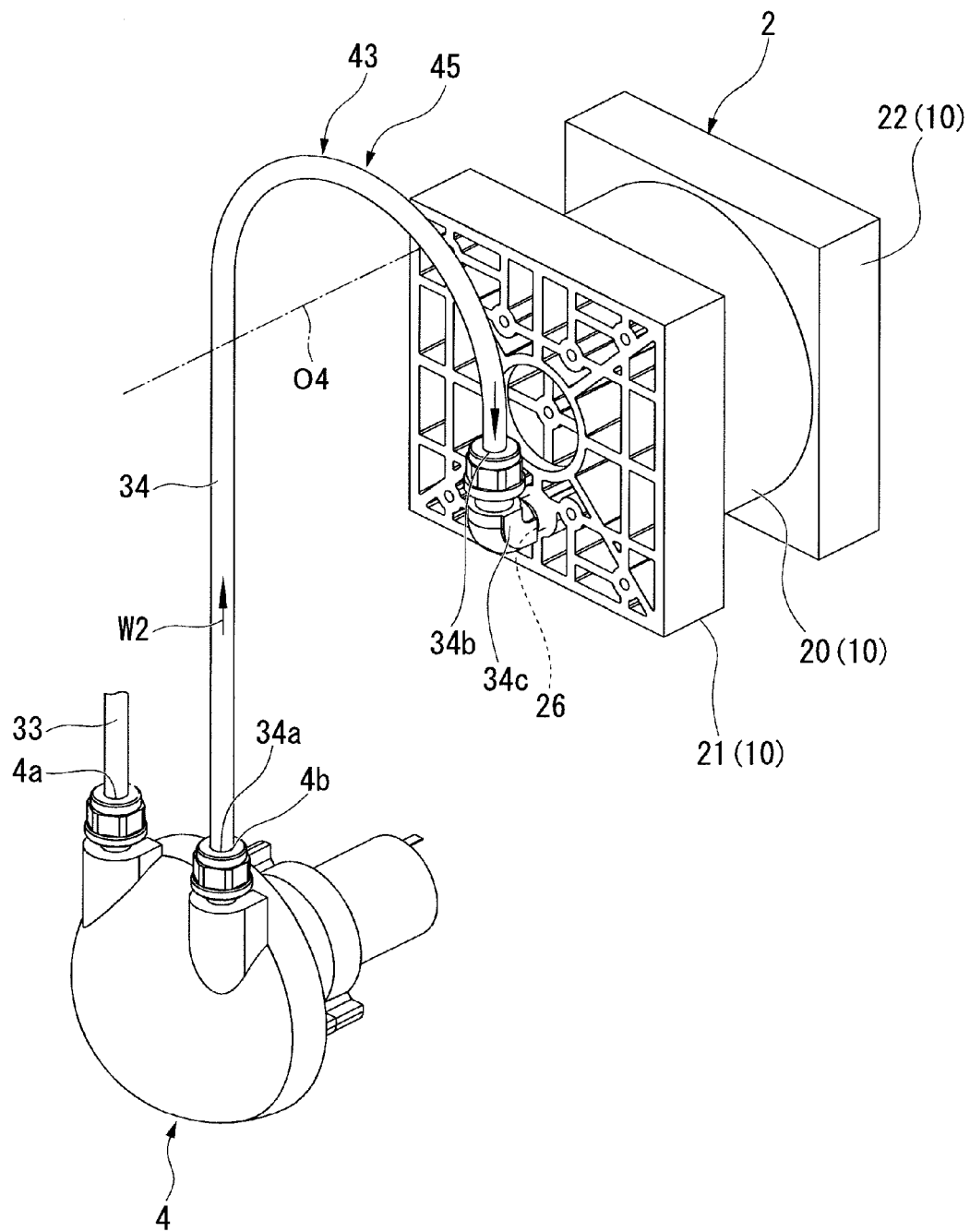
FIG. 15 is a perspective view showing a modification of the electrolysis water-making apparatus related to the first embodiment of the present invention, and is a view showing an electrolyzed solution advection-deterring portion of a dilution water tube.

In addition, contrary to the configuration shown in FIG. 9, in a case where the electrolyzed solution advection-deterring portion 40 composed only of the U-shaped part 41 is formed in the raw material solution tube 32, it is configured as shown in FIG. 14. In this case, a part extending downward from the inlet 26 in the raw material solution tube 32 is formed into the downward slope pipeline 32c. Similarly, contrary to the configuration shown in FIG. 9, in a case where the second electrolyzed solution advection-deterring portion 45 is composed only of the inverted U-shaped part 43, it is configured as shown in FIG. 15. In this case, a part extending upward from the inlet 26 in the dilution water tube 34 is formed into the upward slope pipeline 34c.

Even in a case of being configured as described above, by forming, similar to this embodiment, the electrolyzed solution advection-deterring portions 40 and 45 in the raw material solution tube 32 and the dilution water tube 34 respectively, it is possible to obtain the same operations and effects as that of this embodiment.

In addition, in FIGS. 11, 12, 14 and 15, one inlet 26 is formed in one side plate 21 of the casing 10. The raw material solution tube 32 is connected to the inlet 26 in FIGS. 11 and 14, and the dilution water tube 34 is connected to the inlet 26 in FIGS. 12 and 15. On the other hand, in a case where each of the raw material solution feed pump 3 and the dilution water pump 4 is individually connected to the electrolytic cell 2 as shown in FIG. 10, two inlets 26 (an inlet and a second inlet) may be formed in one side plate 21 of the casing 10, and the raw material solution tube 32 and the dilution water tube 34 are connected to the inlets 26. In addition, an inlet 26 may be formed in each of the pair of side plates 21 and 22 of the casing 10.

Figure 16:
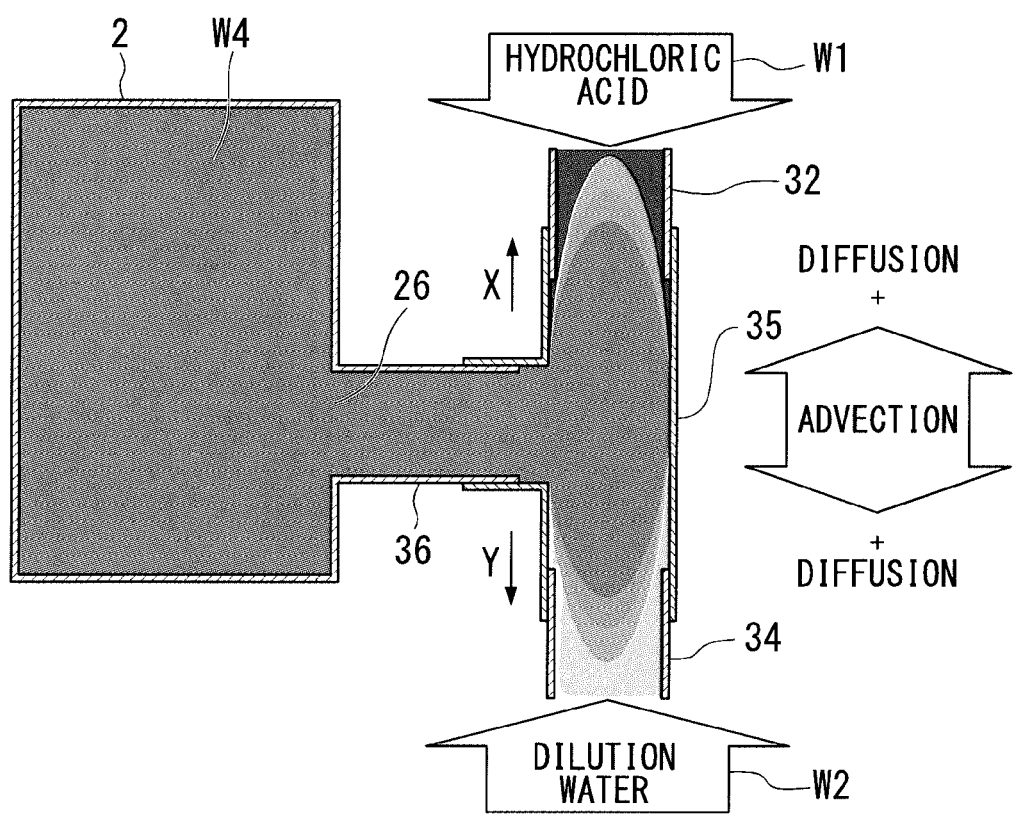
FIG. 16 is a diagram showing a state where an electrolyzed solution is being advected from an electrolytic cell into a raw material solution tube or a dilution water tube.

In this embodiment, as shown in FIG. 3, the electrolysis water-making apparatus A is configured so that the raw material solution tube 32 and the dilution water tube 34 are connected through the T-fitting 35. In this case, as shown in FIG. 16, if the outlet 3b (not shown in FIG. 16) of the raw material solution feed pump 3 used to supply the undiluted solution W1 is positioned above the inlet 26 of the electrolytic cell 2, and if the outlet 4b (not shown in FIG. 16) of the dilution water pump 4 used to supply the dilution water W2 is positioned below the inlet 26 of the electrolytic cell 2, the electrolyzed solution W4 remaining in the electrolytic cell 2 is advected into the T-fitting 35 at the time the operation of the electrolytic cell 2 is stopped. The electrolyzed solution W4 is advected upward in the direction of the arrow X inside the raw material solution tube 32, and is advected downward in the direction of the arrow Y inside the dilution water tube 34. In an opposite manner, the undiluted solution W1 is advected from the raw material solution tube 32 into the electrolytic cell 2, and the dilution water W2 is advected from the dilution water tube 34 into the electrolytic cell 2.

That is, in the electrolysis water-making apparatus A shown in FIG. 3, the electrolyzed solution W4 is advected from the T-fitting 35 to the inverted U-shaped part 42 of the raw material solution tube 32, and is advected from the T-fitting 35 to the U-shaped part 44 of the dilution water tube 34. However, the electrolyzed solution advection-deterring portion 40 prevents the electrolyzed solution W4 from further flowing toward the one end 32a of the raw material solution tube 32, and the electrolyzed solution advection-deterring portion 45 prevents the electrolyzed solution W4 from further flowing toward the one end 34a of the dilution water tube 34.

In addition, although the phenomenon of diffusion occurs even in a case of FIG. 16, the impact which the diffusion has on the electrolysis water-making apparatus A is slight compared to the advection.

Second Embodiment

Next, an electrolysis water-making apparatus related to a second embodiment of the present invention is described with reference to FIGS. 1, 2 and 17. Similar to the first embodiment, this embodiment relates to an electrolysis water-making apparatus for making electrolysis water by electrolyzing an electrolytic solution as a raw material solution including a chlorine ion, and only the configuration of an electrolyzed solution advection-deterring portion is different from that of the first embodiment. Thus, the descriptions of the same configurations as the first embodiment are omitted here.

Figure 17:
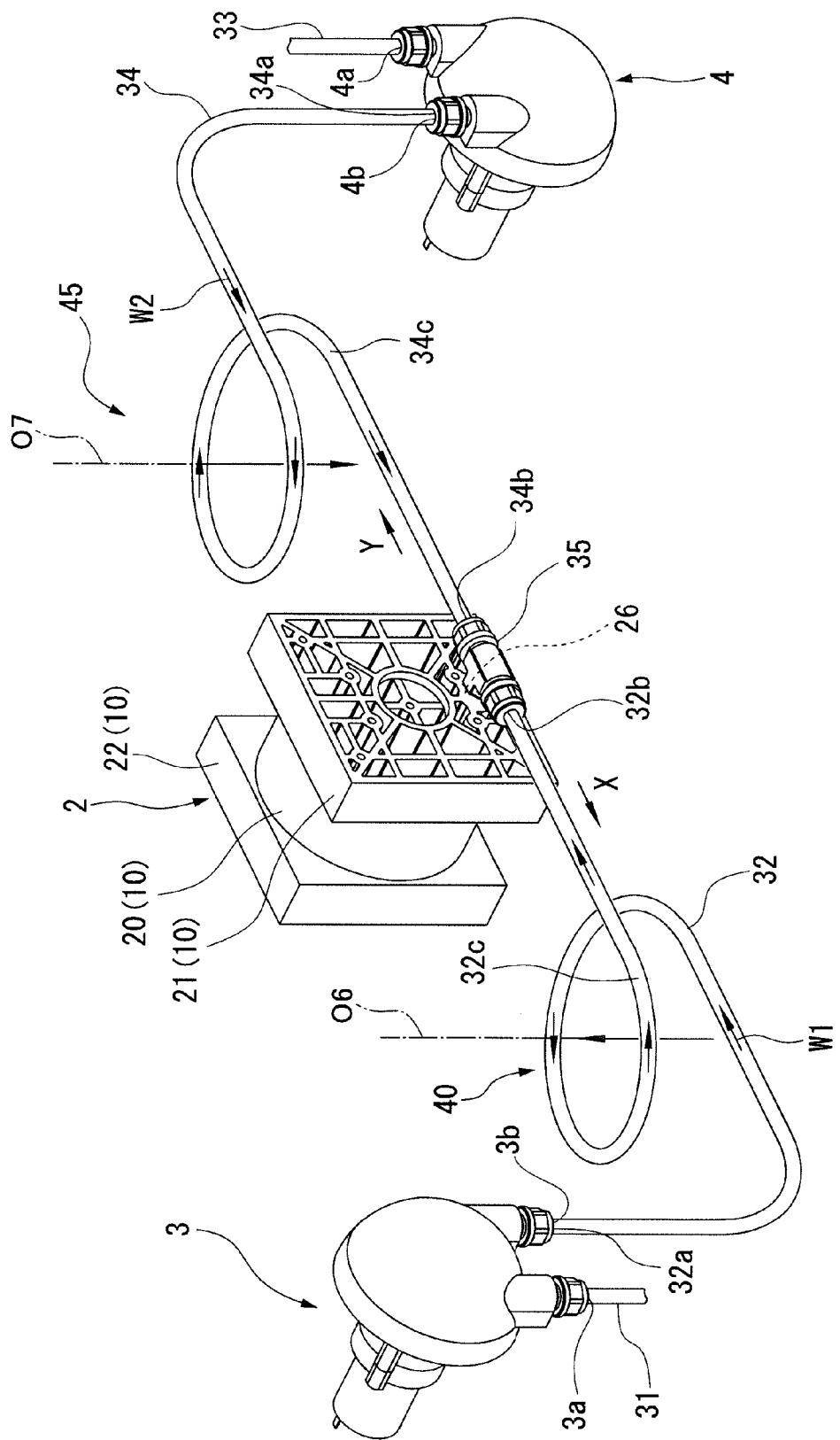
FIG. 17 is a perspective view showing the electrolysis water-making apparatus related to the second embodiment of the present invention.

In an electrolysis water-making apparatus A of this embodiment, as shown in FIG. 17, a raw material solution tube 32 (raw material solution pipe) is arranged so as to form an electrolyzed solution advection-deterring portion 40 between one end 32a (or an outlet 3b) and the other end 32b (or an inlet 26), wherein the electrolyzed solution advection-deterring portion 40 is configured so that a part thereof near the other end 32b is disposed on the upper side of another part thereof near the one end 32a.

In addition, a dilution water tube 34 (dilution water pipe) is arranged so as to form a second electrolyzed solution advection-deterring portion 45 between one end 34a (or an outlet 4b) and the other end 34b (or the inlet 26), wherein the second electrolyzed solution advection-deterring portion 45 is configured so that a part thereof near the other end 34b is disposed on the lower side of another part thereof near the one end 34a.

In this embodiment, the electrolyzed solution advection-deterring portions 40 and 45 of the raw material solution tube 32 and the dilution water tube 34 are formed into annular shapes (loop shapes), as it approaches from the one ends 32a and 34a toward the other ends 32b and 34b, wound around central axes O6 and O7 extending the up-and-down direction (the vertical direction), respectively.

Specifically, the raw material solution tube 32 is formed into an annular shape (a loop shape) wound around the central axis O6 so as to extend downward as it approaches from the other end 32b toward the one end 32a. The shape of the annular raw material solution tube 32 forms a downward slope pipeline 32c (a pitched pipe) sloping downward as it approaches from the other end 32b (or the inlet 26) toward the one end 32a (or the outlet 3b). The downward slope pipeline 32c becomes a principle part of the electrolyzed solution advection-deterring portion 40. That is, the downward slope pipeline 32c is provided in at least a part of the electrolyzed solution advection-deterring portion 40.

In addition, the dilution water tube 34 is formed into an annular shape (a loop shape) wound around the central axis O7 so as to extend upward as it approaches from the other end 34b toward the one end 34a. The shape of the annular dilution water tube 34 forms an upward slope pipeline 34c sloping upward as it approaches from the other end 34b (or the inlet 26) toward the one end 34a (or the outlet 4b). The upward slope pipeline 34c becomes a principle part of the second electrolyzed solution advection-deterring portions 45. That is, the upward slope pipeline 34c is provided in at least a part of the second electrolyzed solution advection-deterring portions 45.

As shown in FIG. 17, the electrolyzed solution W4 at the operation stop of the electrolysis water-making apparatus A flows through the raw material solution tube 32 in the direction of the arrow X from the other end 32b connected to the inlet 26 of the electrolytic cell 2, and then reaches the downward slope pipeline 32c of the electrolyzed solution advection-deterring portion 40. Since the downward slope pipeline 32c extends downward, the electrolyzed solution W4 cannot advance from that position, and it is possible to prevent the electrolyzed solution W4 from further flowing toward the one end 32a of the raw material solution tube 32.

In addition, the electrolyzed solution W4 at the operation stop of the electrolysis water-making apparatus A flows through the dilution water tube 34 in the direction of the arrow Y from the other end 34b connected to the inlet 26 of the electrolytic cell 2, and then reaches the upward slope pipeline 34c of the second electrolyzed solution advection-deterring portions 45. Since the upward slope pipeline 34c extends upward, the electrolyzed solution W4 cannot advance from that position, and it is possible to prevent the electrolyzed solution W4 from further flowing toward the one end 34a of the dilution water tube 34.

In this embodiment, the raw material solution tube 32 is arranged so as to provide the electrolyzed solution advection-deterring portion 40 which is formed into the annular shape, as it approaches from the one end 32a toward the other end 32b, wound around the central axis O6 extending the up-and-down direction and which includes the downward slope pipeline 32c. In addition, the dilution water tube 34 is arranged so as to provide the second electrolyzed solution advection-deterring portions 45 which is formed into the annular shape, as it approaches from the one end 34a toward the other end 34b, wound around the central axis O7 extending the up-and-down direction and which includes the upward slope pipeline 34c.

Accordingly, in the electrolysis water-making apparatus A of this embodiment, even if the raw material solution feed pump 3 is provided so that the outlet 3b of the raw material solution feed pump 3 is disposed on the upper side of the inlet 26 of the electrolytic cell 2, similar to the first embodiment, it is possible to prevent the electrolyzed solution W4 from flowing from the electrolytic cell 2 into the pipe 32 connected to the raw material solution feed pump 3 immediately after the operation stop thereof. In addition, even if the dilution water pump 4 is provided so that the outlet 4b of the dilution water pump 4 is disposed on the lower side of the inlet 26 of the electrolytic cell 2, it is possible to prevent the electrolyzed solution W4 from flowing from the electrolytic cell 2 into the pipe 34 connected to the dilution water pump 4 immediately after the operation stop.

Consequently, the corrosion of component parts due to the electrolyzed solution W4 can be prevented, and it is possible to extend the lives of the component parts. In addition, it is possible to decrease the frequency of replacement of the component parts, and to provide an electrolysis water-making apparatus A having excellent durability, economic efficiency, and reliability.

Furthermore, by arranging the raw material solution tube 32 as described above, it is possible to reliably and easily form the electrolyzed solution advection-deterring portion 40 which is configured so that a part thereof near the other end 32b is disposed on the upper side of another part thereof near the one end 32a. In addition, by arranging the dilution water tube 34 as described above, it is possible to reliably and easily form the second electrolyzed solution advection-deterring portion 45 which is configured so that a part thereof near the other end 34b is disposed on the lower side of another part thereof near the one end 34a.

Hereinbefore, the second embodiment of the electrolysis water-making apparatus related to the present invention has been described. However, the present invention is not limited to the above-described second embodiment, and the configuration can be appropriately modified within the scope of the present invention, the scope including the modifications of the first embodiment.

Figure 18:
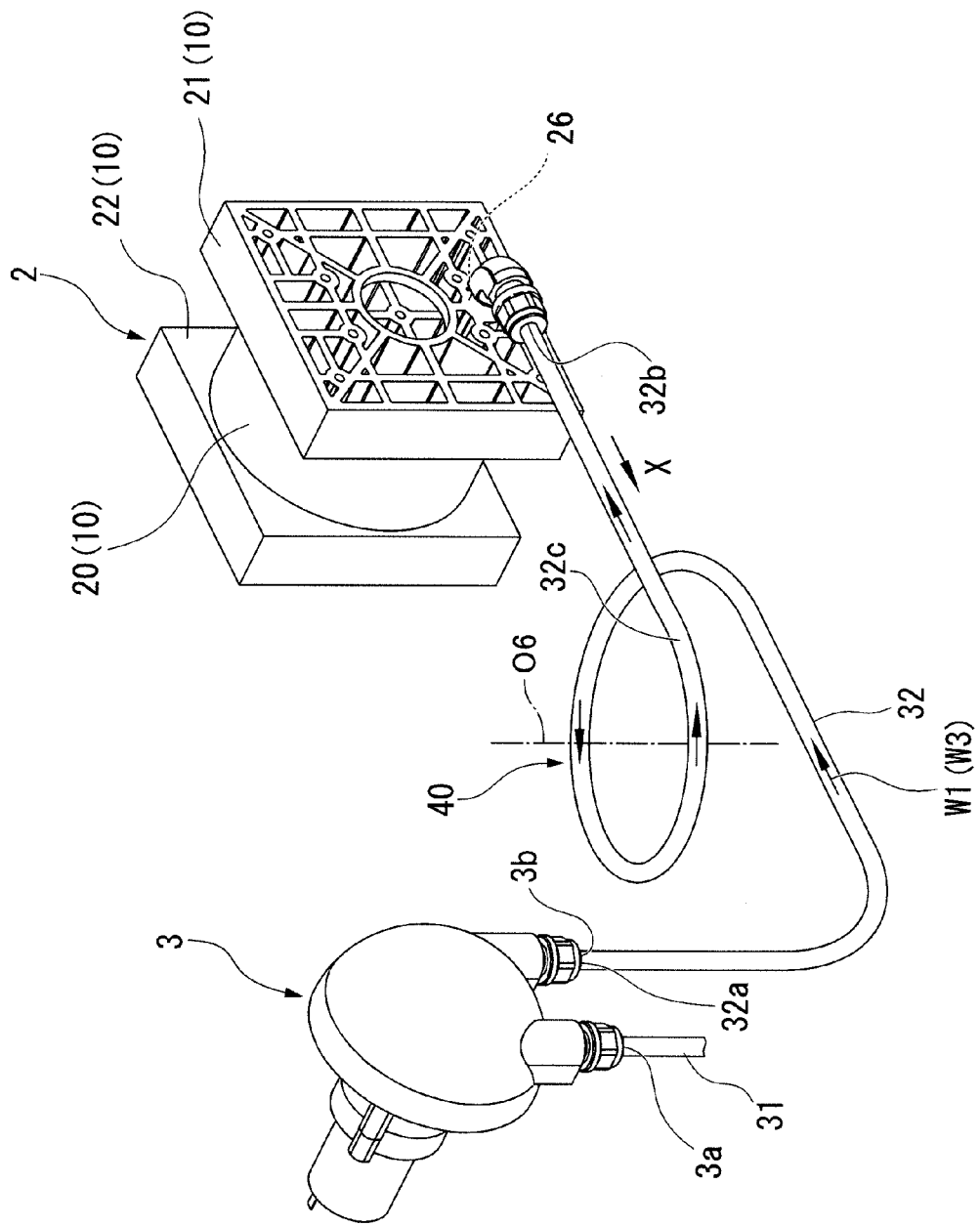
FIG. 18 is a perspective view showing a modification of the electrolysis water-making apparatus related to the second embodiment of the present invention, and is a view showing an electrolyzed solution advection-deterring portion of a raw material solution tube.
Figure 19:
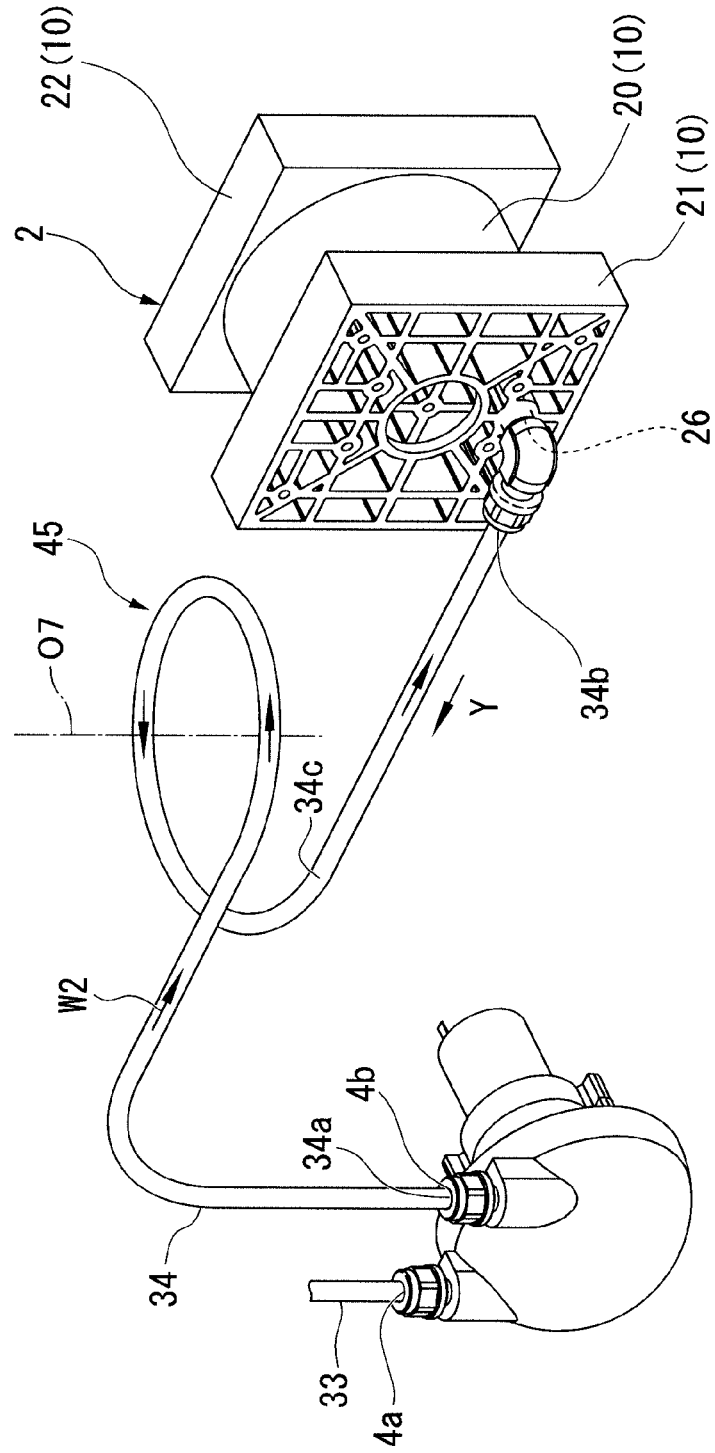
FIG. 19 is a perspective view showing a modification of the electrolysis water-making apparatus related to the second embodiment of the present invention, and is a view showing an electrolyzed solution advection-deterring portion of a dilution water tube.

For example, as shown in FIG. 10, in a case where each of the raw material solution feed pump 3 and the dilution water pump 4 is individually connected to the electrolytic cell 2 and where the undiluted solution W1 supplied from the raw material solution feed pump 3 and the dilution water W2 supplied from the dilution water pump 4 are mixed together inside the electrolytic cell 2, thereby letting the electrolyte solution W3 having a predetermined concentration flow in the electrolytic cell 2, it is only necessary to be configured as shown in FIGS. 18 and 19. In addition, as shown in FIG. 13, in a case where the electrolyte solution W3 which has been adjusted to have a predetermined concentration by mixing the undiluted solution W1 and the dilution water W2 beforehand is supplied into the electrolytic cell 2 by the raw material solution feed pump 3, it is only necessary to be configured as shown in FIG. 18.

Even in a case of being configured as described above, by forming the electrolyzed solution advection-deterring portions 40 and 45 in the raw material solution tube 32 and the dilution water tube 34 similar to this embodiment, it is possible to obtain the same operations and effects as that of this embodiment.

Third Embodiment

Next, an electrolysis water-making apparatus related to a third embodiment of the present invention is described with reference to FIGS. 1, 2 and 20. In this embodiment, only the configuration of an electrolyzed solution advection-deterring portion is different from that of the first and second embodiments. Thus, the descriptions of the same configurations as the first and second embodiments are omitted here.

Figure 20:
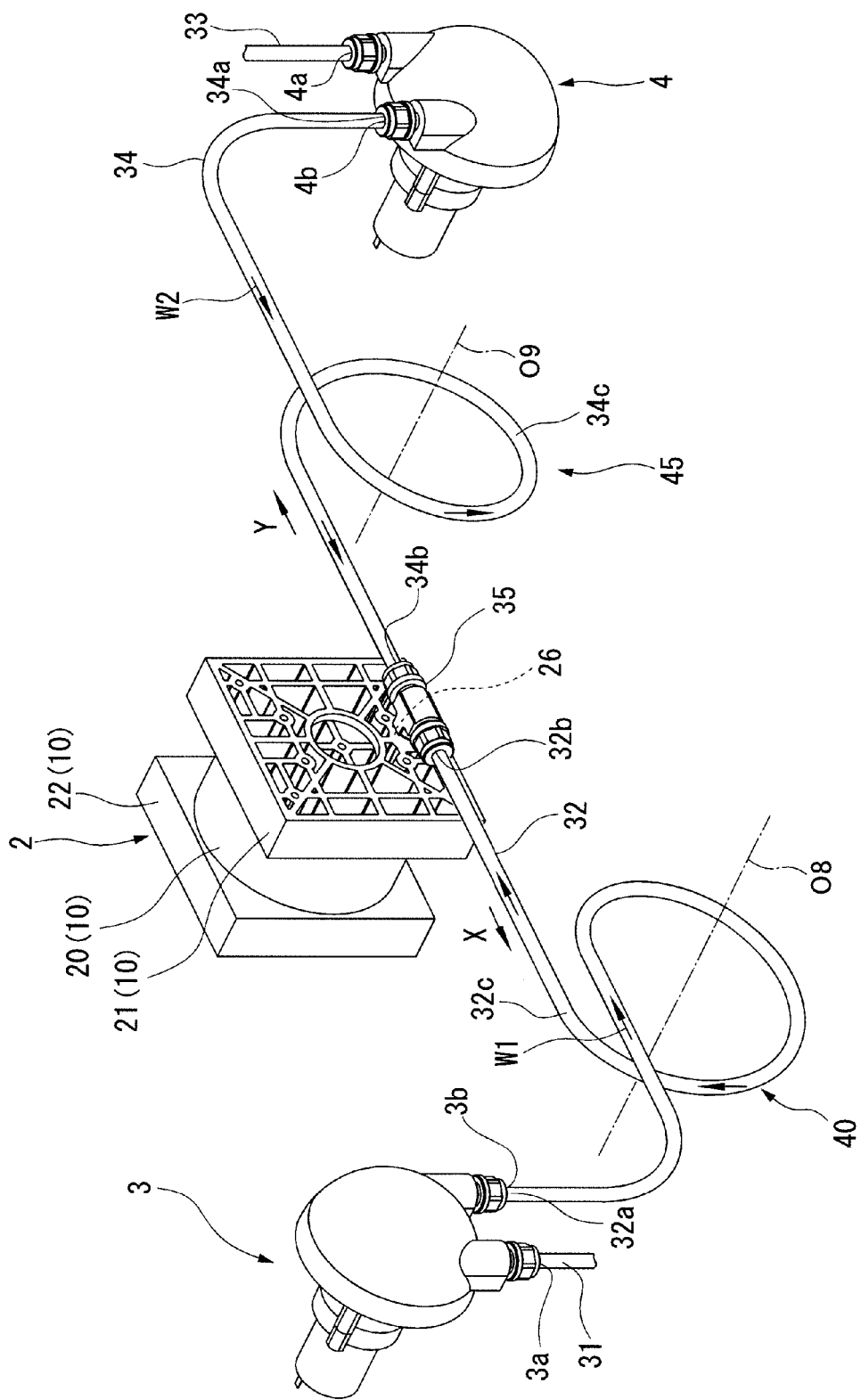
FIG. 20 is a perspective view showing the electrolysis water-making apparatus related to the third embodiment of the present invention.

In an electrolysis water-making apparatus A of this embodiment shown in FIG. 20, similar to the first and second embodiments, a raw material solution tube 32 (raw material solution pipe) is arranged so as to form an electrolyzed solution advection-deterring portion 40 between one end 32a and the other end 32b, wherein the electrolyzed solution advection-deterring portion 40 is configured so that a part thereof near the other end 32b is disposed on the upper side of another part thereof near the one end 32a. In addition, a dilution water tube 34 (dilution water pipe) is arranged so as to form a second electrolyzed solution advection-deterring portion 45 between one end 34a and the other end 34b, wherein the second electrolyzed solution advection-deterring portion 45 is configured so that a part thereof near the other end 34b is disposed on the lower side of another part thereof near the one end 34a.

In this embodiment, the electrolyzed solution advection-deterring portions 40 and 45 of the raw material solution tube 32 and the dilution water tube 34 are formed into annular shapes (loop shapes), as it approaches from the one ends 32a and 34a toward the other ends 32b and 34b, wound around central axes O8 and O9 extending a lateral direction (the horizontal direction), respectively.

Specifically, the raw material solution tube 32 is formed into an annular shape (a loop shape), as it approaches from the other end 32b toward the one end 32a, wound around the central axis O8 after starting to advance downward. A downward slope pipeline 32c (a pitched pipe) sloping downward as it approaches from the other end 32b (or the inlet 26) toward the one end 32a (or the outlet 3b) is formed of part of the annular raw material solution tube 32 which starts to advance downward. The downward slope pipeline 32c becomes a principle part of the electrolyzed solution advection-deterring portion 40.

In addition, the dilution water tube 34 is formed into an annular shape (a loop shape), as it approaches from the other end 34b toward the one end 34a, wound around the central axis O9 after starting to advance downward. An upward slope pipeline 34c (a second pitched pipe) sloping upward as it approaches from the other end 34b (or the inlet 26) toward the one end 34a (or the outlet 4b) is formed of part of the annular dilution water tube 34 which starts to advance upward after advancing downward. The upward slope pipeline 34c becomes a principle part of the second electrolyzed solution advection-deterring portions 45.

As shown in FIG. 20, the electrolyzed solution W4 at the operation stop of the electrolysis water-making apparatus A flows through the raw material solution tube 32 in the direction of the arrow X from the other end 32b connected to the inlet 26 of the electrolytic cell 2, and then reaches the downward slope pipeline 32c of the electrolyzed solution advection-deterring portion 40. Since the downward slope pipeline 32c extends downward, the electrolyzed solution W4 cannot advance from that position, and it is possible to prevent the electrolyzed solution W4 from further flowing toward the one end 32a of the raw material solution tube 32.

In addition, the electrolyzed solution W4 at the operation stop of the electrolysis water-making apparatus A flows through the dilution water tube 34 in the direction of the arrow Y from the other end 34b connected to the inlet 26 of the electrolytic cell 2, and then reaches the upward slope pipeline 34c of the second electrolyzed solution advection-deterring portions 45. Since the upward slope pipeline 34c extends upward after extending downward once, the electrolyzed solution W4 cannot advance from that position, and it is possible to prevent the electrolyzed solution W4 from further flowing toward the one end 34a of the dilution water tube 34.

In this embodiment, the raw material solution tube 32 is arranged so as to provide the electrolyzed solution advection-deterring portion 40 which is formed into the annular shape, as it approaches from the one end 32a toward the other end 32b, wound around the central axis O8 extending the lateral direction (the horizontal direction) and which includes the downward slope pipeline 32c. In addition, the dilution water tube 34 is arranged so as to provide the second electrolyzed solution advection-deterring portions 45 which is formed into the annular shape, as it approaches from the one end 34a toward the other end 34b, wound around the central axis O9 extending the lateral direction (the horizontal direction) and which includes the upward slope pipeline 34c.

Accordingly, in the electrolysis water-making apparatus A of this embodiment, even if the raw material solution feed pump 3 is provided so that the outlet 3b of the raw material solution feed pump 3 is disposed on the upper side of the inlet 26 of the electrolytic cell 2, similar to the first and second embodiments, the electrolyzed solution W4 from the electrolytic cell 2 can be prevented from flowing beyond the electrolyzed solution advection-deterring portion 40 in the pipe 32 connected to the raw material solution feed pump 3 immediately after the operation stop thereof. In addition, even if the dilution water pump 4 is provided so that the outlet 4b of the dilution water pump 4 is disposed on the lower side of the inlet 26 of the electrolytic cell 2, the electrolyzed solution W4 from the electrolytic cell 2 can be prevented from flowing beyond the second electrolyzed solution advection-deterring portions 45 in the pipe 34 connected to the dilution water pump 4 immediately after the operation stop.

Consequently, the corrosion of component parts due to the electrolyzed solution W4 can be prevented, and it is possible to extend the lives of the component parts. In addition, it is possible to decrease the frequency of replacement of the component parts, and to provide an electrolysis water-making apparatus A having excellent durability, economic efficiency, and reliability.

Furthermore, by arranging the raw material solution tube 32 as described above, it is possible to reliably and easily form the electrolyzed solution advection-deterring portion 40 which is configured so that a part thereof near the other end 32b is disposed on the upper side of another part thereof near the one end 32a. In addition, by arranging the dilution water tube 34 as described above, it is possible to reliably and easily form the second electrolyzed solution advection-deterring portion 45 which is configured so that a part thereof near the other end 34b is disposed on the lower side of another part thereof near the one end 34a.

Hereinbefore, the third embodiment of the electrolysis water-making apparatus related to the present invention has been described. However, the present invention is not limited to the above-described third embodiment, and the configuration can be appropriately modified within the scope of the present invention, the scope including the modifications of the first and second embodiments.

Figure 21:
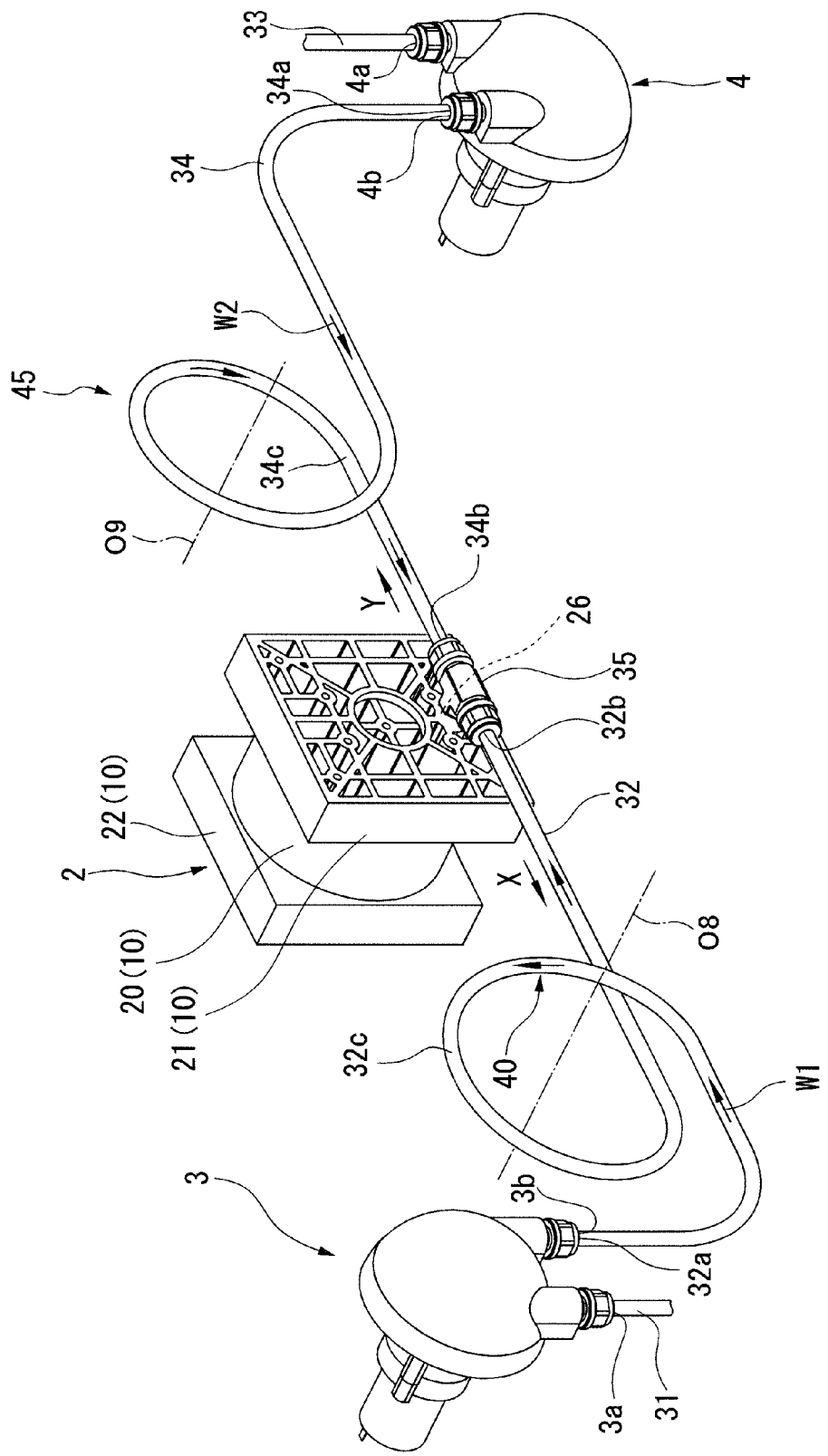
FIG. 21 is a perspective view showing a modification of the electrolysis water-making apparatus related to the third embodiment of the present invention.
Figure 22:
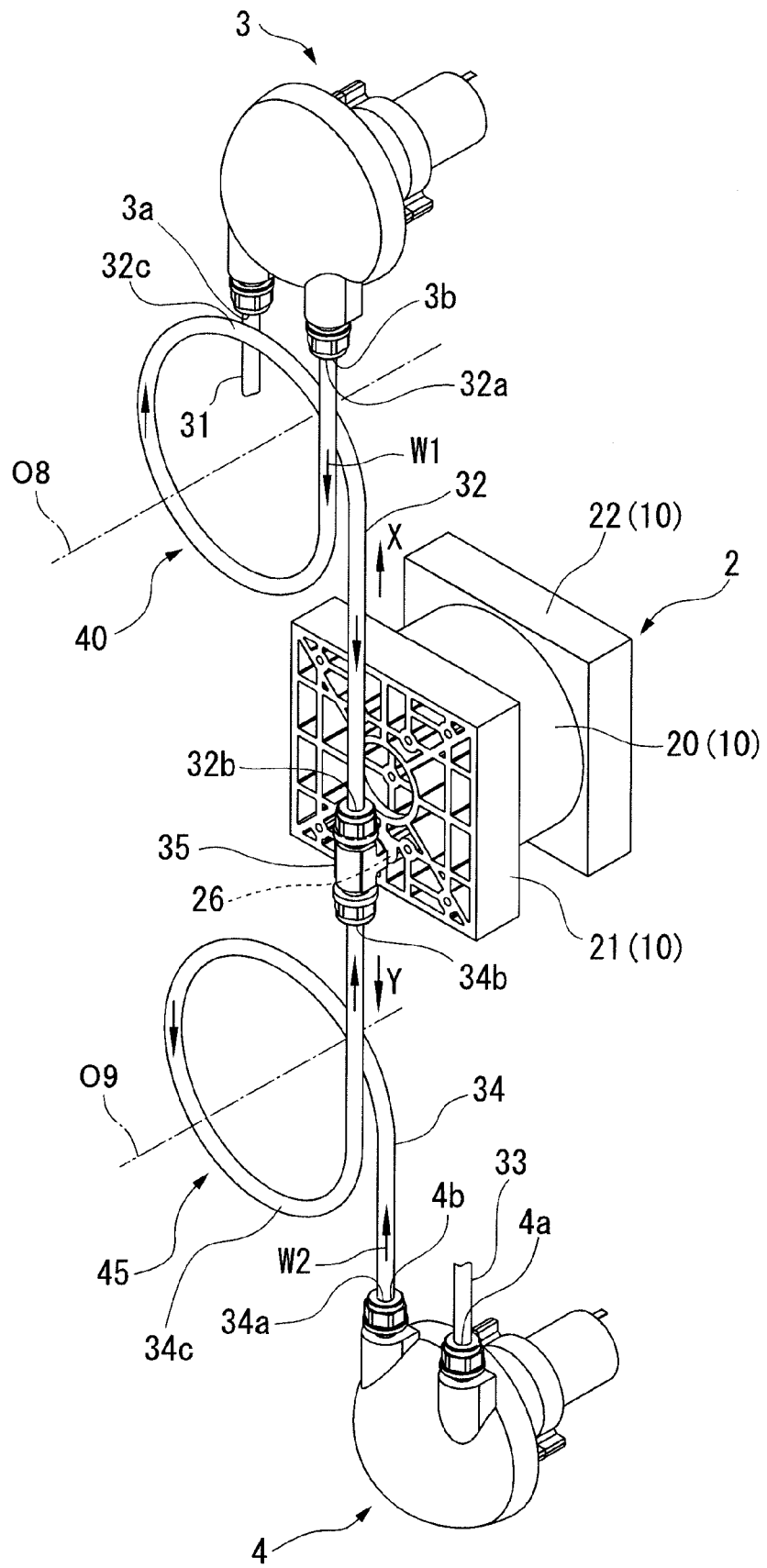
FIG. 22 is a perspective view showing a modification of the electrolysis water-making apparatus related to the third embodiment of the present invention.

For example, although FIG. 20 shows the electrolyzed solution advection-deterring portions 40 and 45 which have a loop shape protruding downward from a horizontal plane in which the inlet 26 of the electrolytic cell 2 is positioned, as shown in FIG. 21, electrolyzed solution advection-deterring portions 40 and 45 may be formed so as to have a loop shape protruding upward from a horizontal plane in which the inlet 26 of the electrolytic cell 2 is positioned. Even in this configuration, it is possible to obtain the same operations and effects as that of this embodiment. In addition, as shown in FIG. 22, electrolyzed solution advection-deterring portions 40 and 45 may be formed so as to have a loop shape protruding sideward from a vertical plane in which the inlet 26 of the electrolytic cell 2 is positioned. Even in this configuration, it is possible to obtain the same operations and effects as that of this embodiment.

Figure 23:
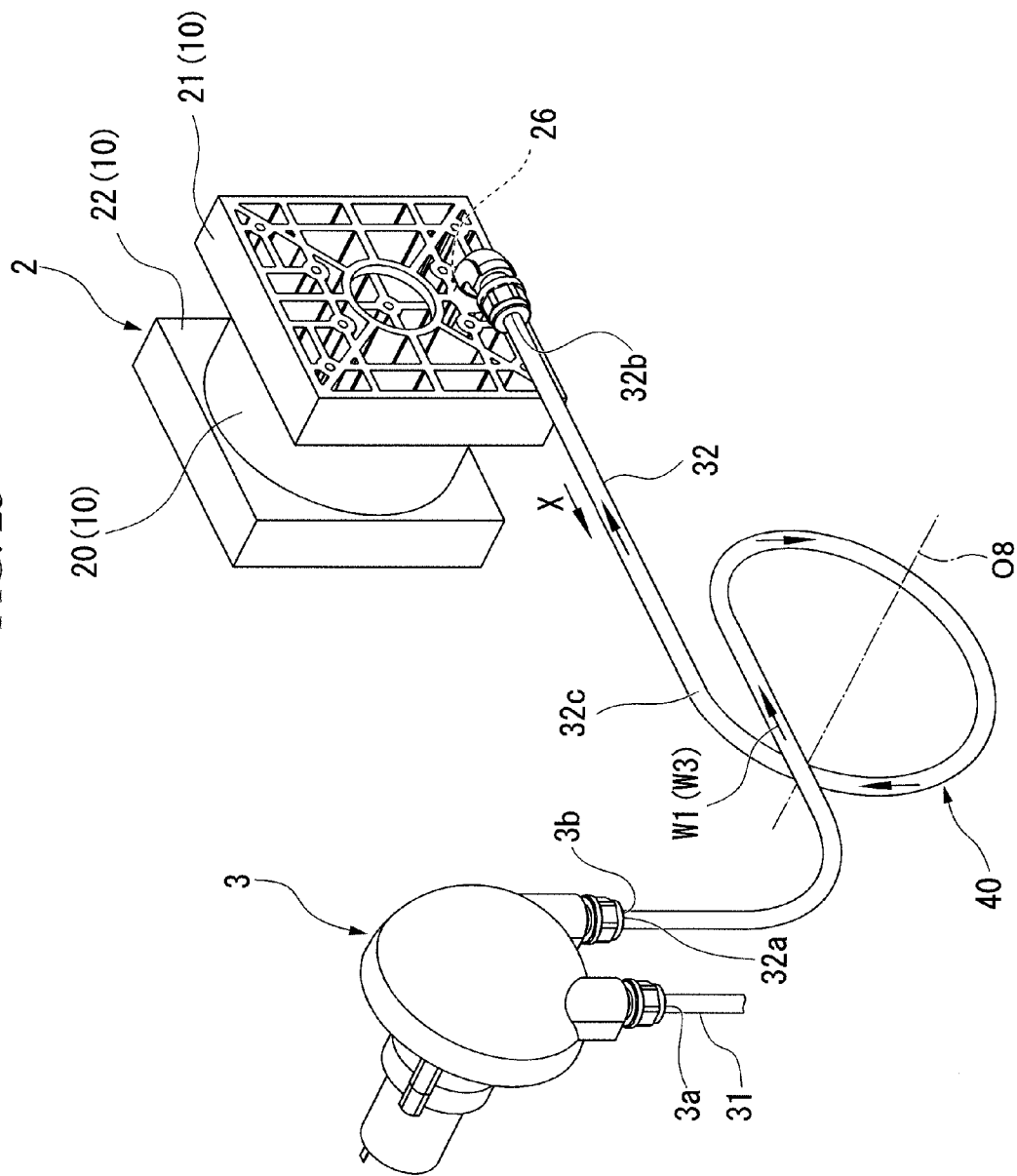
FIG. 23 is a perspective view showing a modification of the electrolysis water-making apparatus related to the third embodiment of the present invention, and is a view showing an electrolyzed solution advection-deterring portion of a raw material solution tube.
Figure 24:
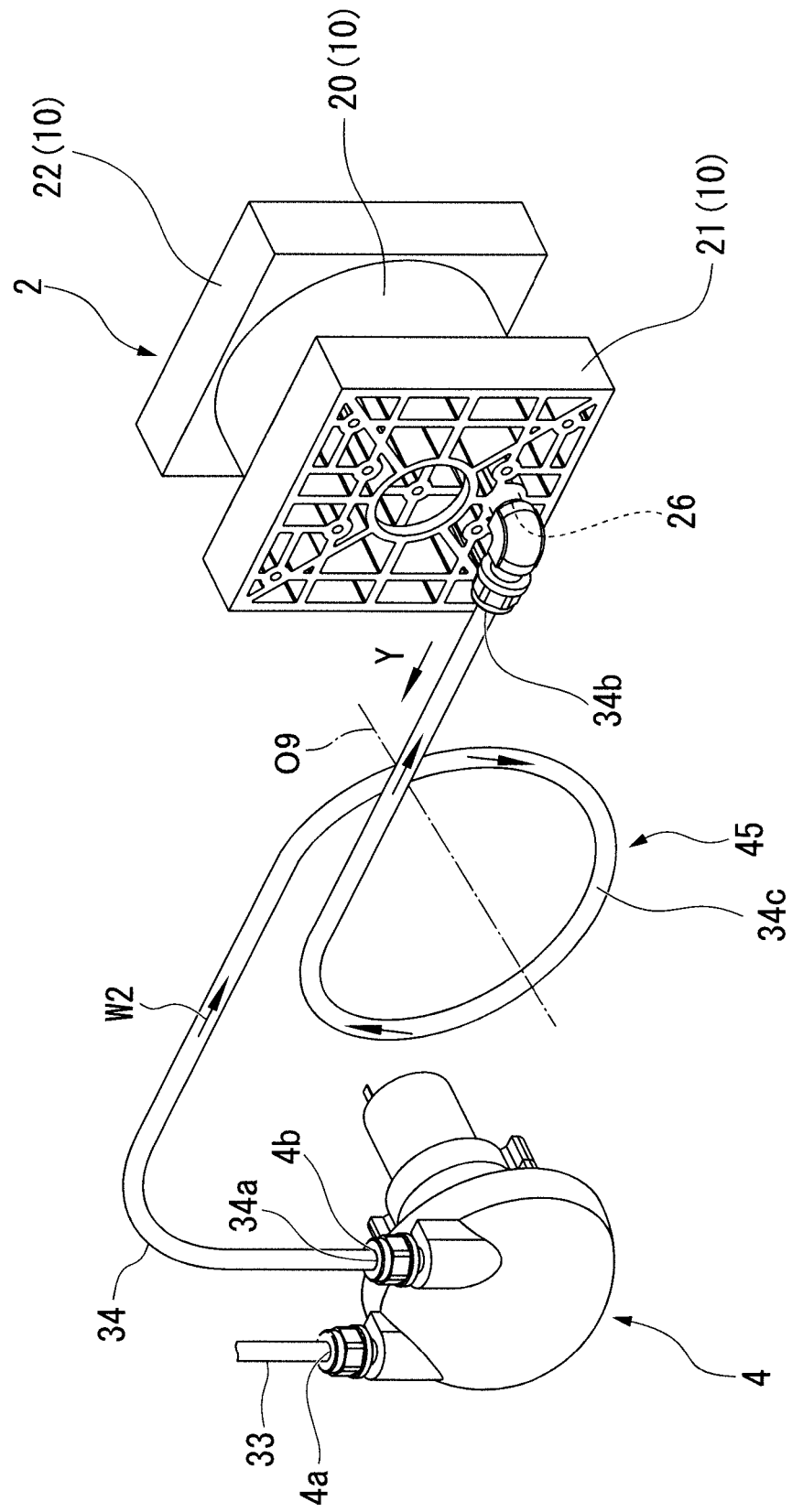
FIG. 24 is a perspective view showing a modification of the electrolysis water-making apparatus related to the third embodiment of the present invention, and is a view showing an electrolyzed solution advection-deterring portion of a dilution water tube.
Figure 25:
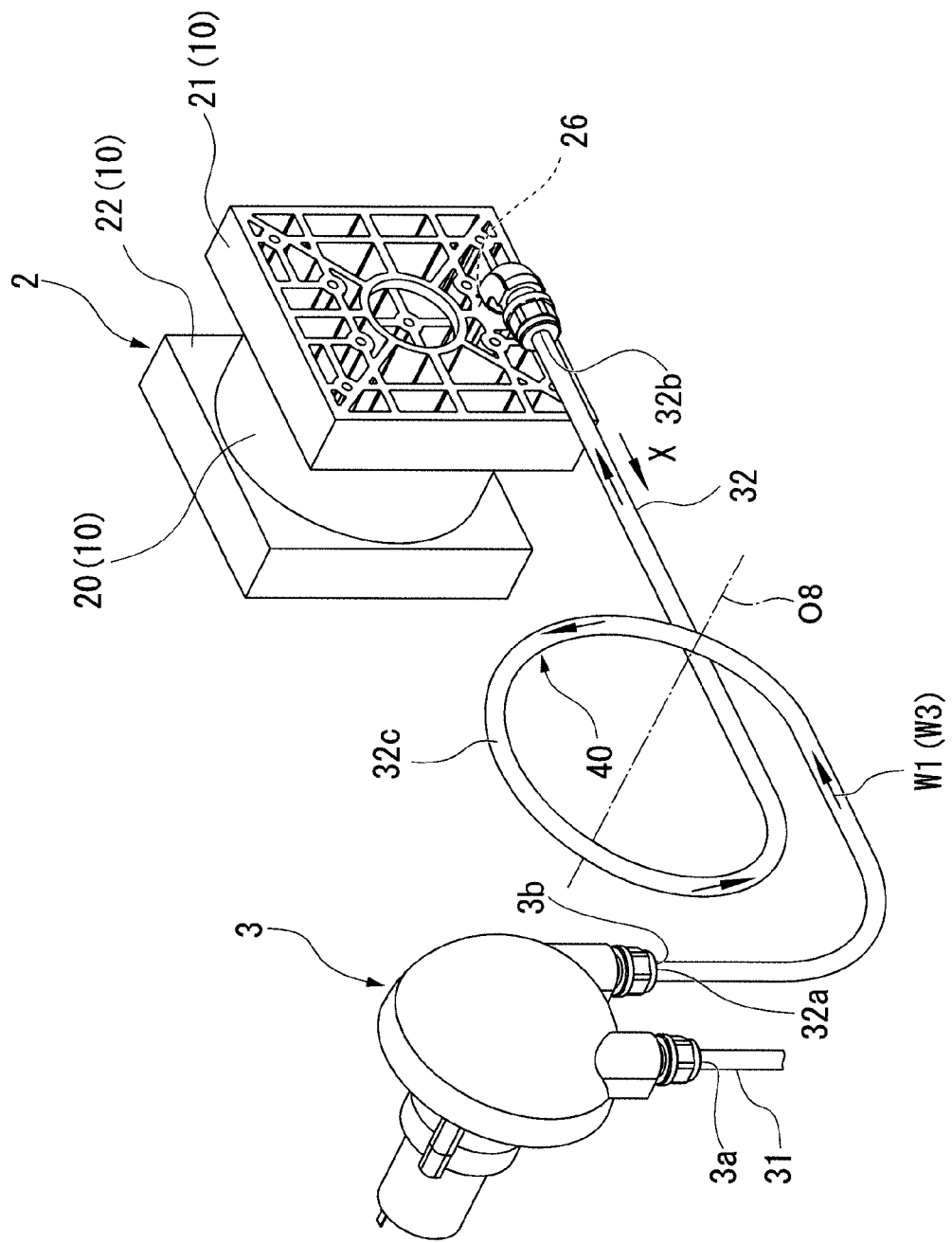
FIG. 25 is a perspective view showing a modification of the electrolysis water-making apparatus related to the third embodiment of the present invention, and is a view showing an electrolyzed solution advection-deterring portion of a raw material solution tube.
Figure 26:
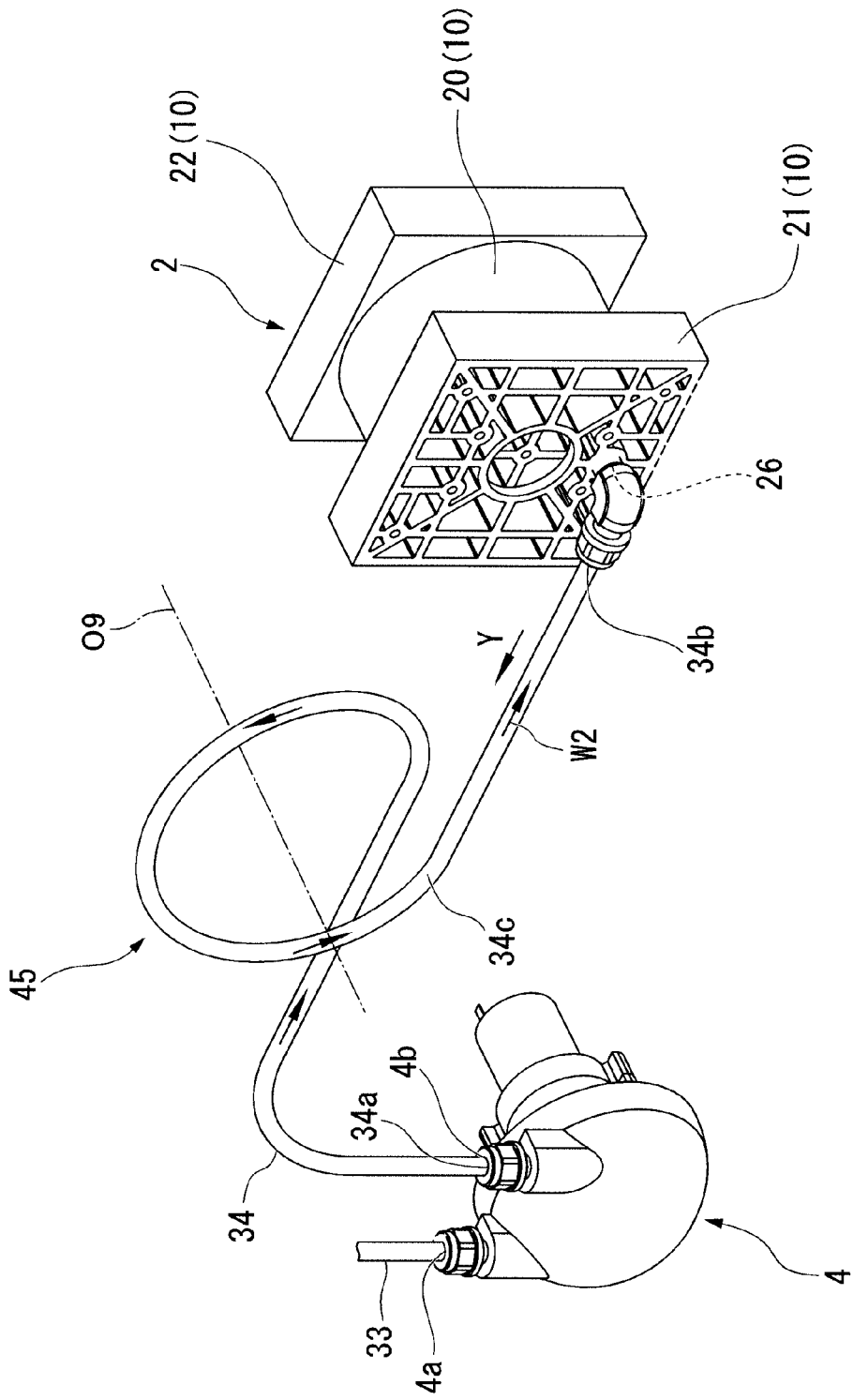
FIG. 26 is a perspective view showing a modification of the electrolysis water-making apparatus related to the third embodiment of the present invention, and is a view showing an electrolyzed solution advection-deterring portion of a dilution water tube.
Figure 27:
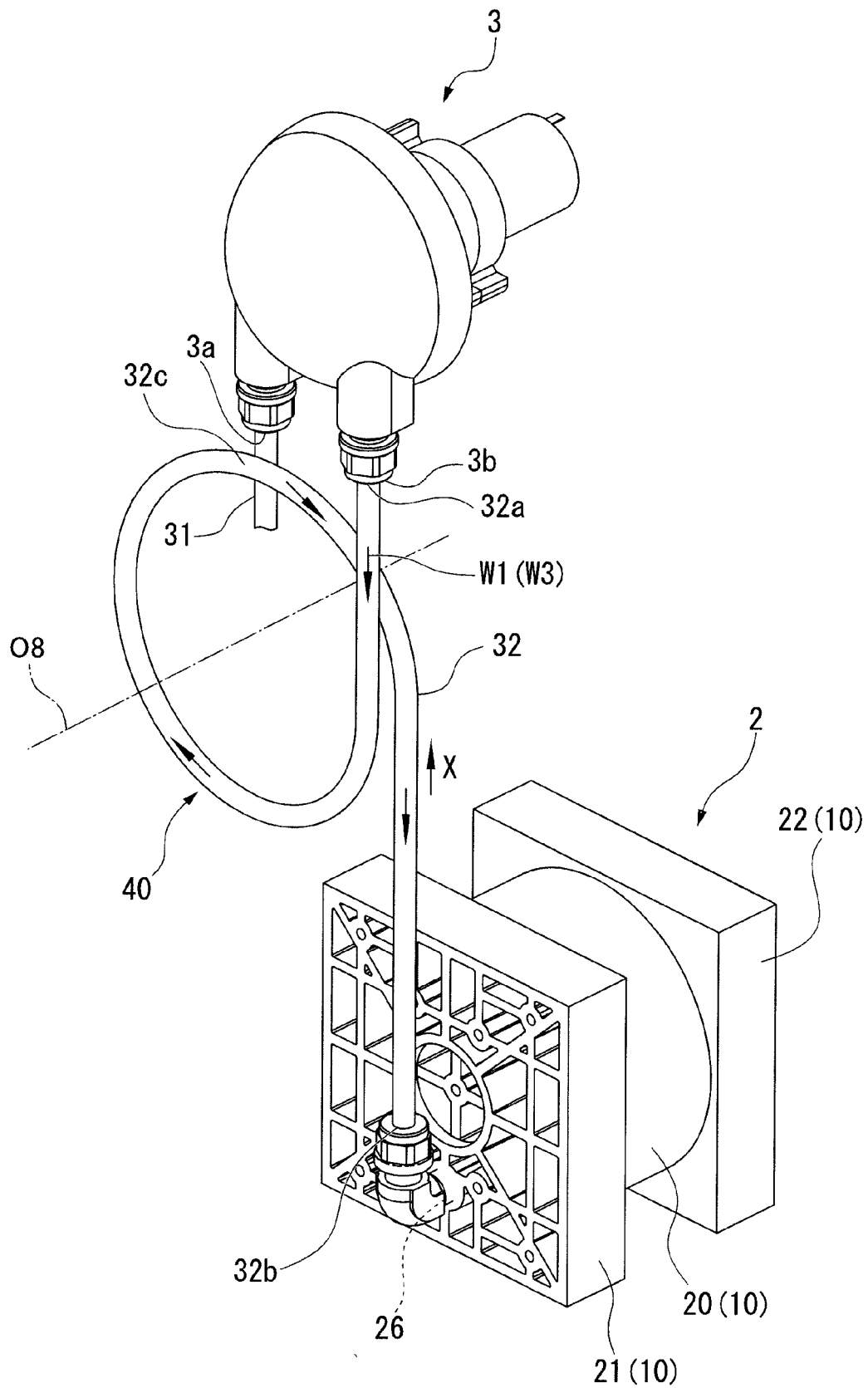
FIG. 27 is a perspective view showing a modification of the electrolysis water-making apparatus related to the third embodiment of the present invention, and is a view showing an electrolyzed solution advection-deterring portion of a raw material solution tube.
Figure 28:
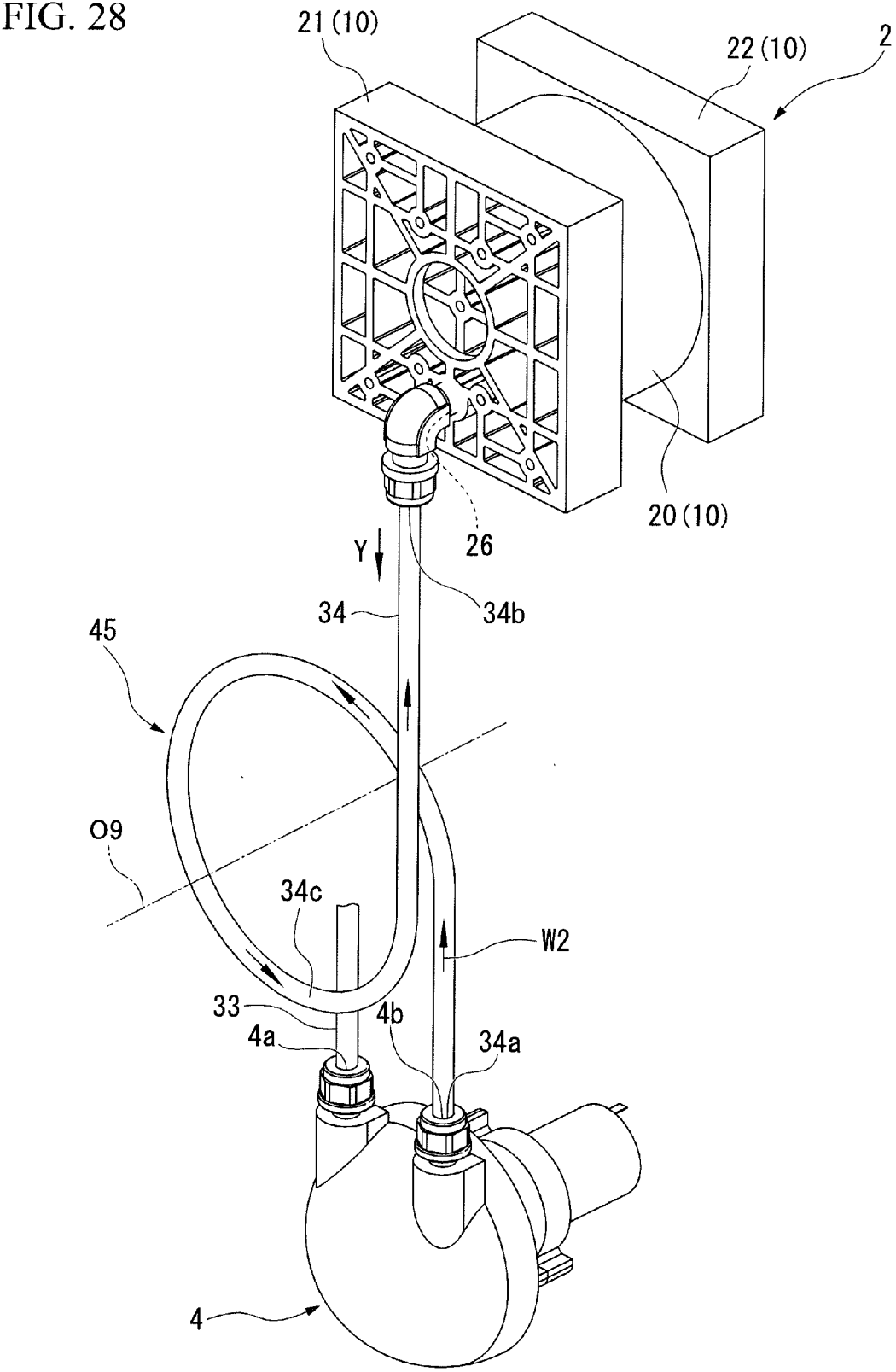
FIG. 28 is a perspective view showing a modification of the electrolysis water-making apparatus related to the third embodiment of the present invention, and is a view showing an electrolyzed solution advection-deterring portion of a dilution water tube.

In addition, as shown in FIG. 10, in a case where each of the raw material solution feed pump 3 and the dilution water pump 4 is individually connected to the electrolytic cell 2 and where the undiluted solution W1 supplied from the raw material solution feed pump 3 and the dilution water W2 supplied from the dilution water pump 4 are mixed together inside the electrolytic cell 2, thereby letting the electrolyte solution W3 having a predetermined concentration flow in the electrolytic cell 2, it is only necessary to be configured as shown in FIGS. 23 to 28. In addition, as shown in FIG. 13, in a case where the electrolyte solution W3 which has been adjusted to have a predetermined concentration by mixing the undiluted solution W1 and the dilution water W2 beforehand is supplied into the electrolytic cell 2 by the raw material solution feed pump 3, it is only necessary to be configured as shown in FIGS. 23, 25 and 27.

Even in a case of being configured as described above, by forming the electrolyzed solution advection-deterring portions 40 and 45 in the raw material solution tube 32 and the dilution water tube 34 similar to this embodiment, it is possible to obtain the same operations and effects as that of this embodiment.

Fourth Embodiment

Next, an electrolysis water-making apparatus related to a fourth embodiment of the present invention is described with reference to FIGS. 1, 2 and 29. In this embodiment, only the configuration of an electrolyzed solution advection-deterring portion is different from that of the first, second and third embodiments. Thus, the descriptions of the same configurations as the first, second and third embodiments are omitted here.

Figure 29:
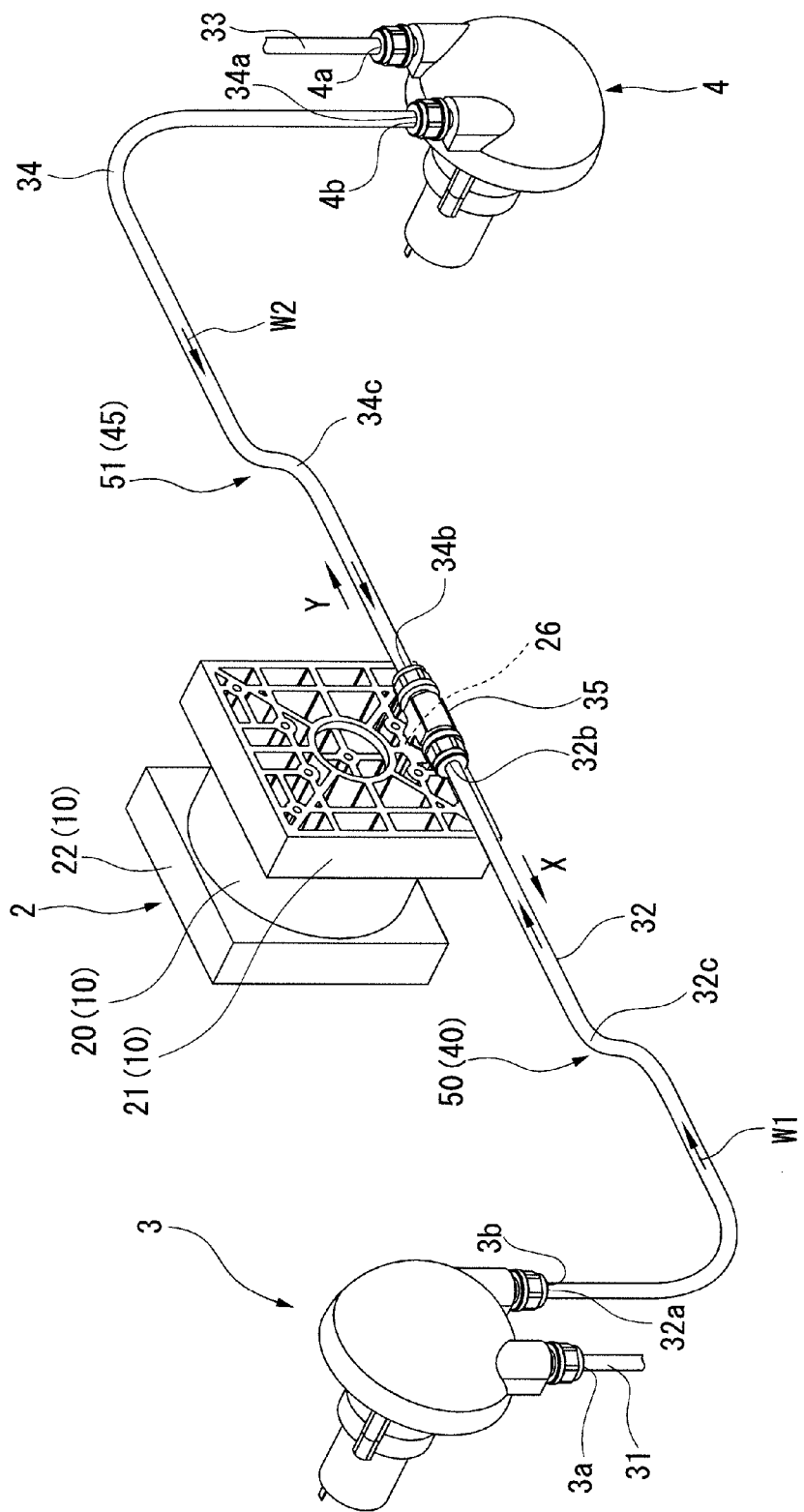
FIG. 29 is a perspective view showing the electrolysis water-making apparatus related to the fourth embodiment of the present invention.

In an electrolysis water-making apparatus A of this embodiment shown in FIG. 29, similar to the first, second and third embodiments, a raw material solution tube 32 (raw material solution pipe) is arranged so as to form an electrolyzed solution advection-deterring portion 40 between one end 32a and the other end 32b, wherein the electrolyzed solution advection-deterring portion 40 is configured so that a part thereof near the other end 32b is disposed on the upper side of another part thereof near the one end 32a. In addition, a dilution water tube 34 (dilution water pipe) is arranged so as to form a second electrolyzed solution advection-deterring portion 45 between one end 34a and the other end 34b, wherein the second electrolyzed solution advection-deterring portion 45 is configured so that a part thereof near the other end 34b is disposed on the lower side of another part thereof near the one end 34a.

In this embodiment, the electrolyzed solution advection-deterring portion 40 of the raw material solution tube 32 is formed to include a tiered part 50 between the one end 32a and the other end 32b of the raw material solution tube 32, wherein the tiered part 50 slopes upward as it approaches from the one end 32a toward the other end 32b. In addition, the second electrolyzed solution advection-deterring portion 45 of the dilution water tube 34 is formed to include a tiered part 51 (second tiered part) between the one end 34a and the other end 34b of the dilution water tube 34, wherein the tiered part 51 slopes downward as it approaches from the one end 34a toward the other end 34b.

A downward slope pipeline 32c sloping downward as it approaches from the other end 32b (or the inlet 26) toward the one end 32a (or the outlet 3b) is formed of the tiered part 50, and the tiered part 50 becomes a principle part of the electrolyzed solution advection-deterring portion 40.

In addition, An upward slope pipeline 34c sloping upward as it approaches from the other end 34b (or the inlet 26) toward the one end 34a (or the outlet 4b) is formed of the tiered part 51, and the tiered part 51 becomes a principle part of the second electrolyzed solution advection-deterring portion 45.

The electrolyzed solution W4 at the operation stop of the electrolysis water-making apparatus A flows through the raw material solution tube 32 in the direction of the arrow X from the other end 32b connected to the inlet 26 of the electrolytic cell 2, and then reaches the downward slope pipeline 32c of the tiered part 50 (the electrolyzed solution advection-deterring portions 40). Since the downward slope pipeline 32c extends downward, the electrolyzed solution W4 cannot advance from that position, and it is possible to prevent the electrolyzed solution W4 from further flowing toward the one end 32a of the raw material solution tube 32.

In addition, the electrolyzed solution W4 at the operation stop of the electrolysis water-making apparatus A flows through the dilution water tube 34 in the direction of the arrow Y from the other end 34b connected to the inlet 26 of the electrolytic cell 2, and then reaches the upward slope pipeline 34c of the tiered part 51 (the second electrolyzed solution advection-deterring portions 45). Since the upward slope pipeline 34c extends upward, the electrolyzed solution W4 cannot advance from that position, and it is possible to prevent the electrolyzed solution W4 from further flowing toward the one end 34a of the dilution water tube 34.

In this embodiment, the raw material solution tube 32 is arranged so as to provide the downward slope pipeline 32c formed as the tiered part 50 (the electrolyzed solution advection-deterring portions 40) which slopes upward as it approaches from the one end 32a toward the other end 32b. In addition, the dilution water tube 34 is arranged so as to provide the upward slope pipeline 34c formed as the tiered part 51 (the second electrolyzed solution advection-deterring portions 45) which slopes downward as it approaches from the one end 34a toward the other end 34b.

Accordingly, in the electrolysis water-making apparatus A of this embodiment, even if the raw material solution feed pump 3 is provided so that the outlet 3b of the raw material solution feed pump 3 is disposed on the upper side of the inlet 26 of the electrolytic cell 2, similar to the first, second and third embodiments, the electrolyzed solution W4 from the electrolytic cell 2 can be prevented from flowing beyond the electrolyzed solution advection-deterring portions 40 in the pipe 32 connected to the raw material solution feed pump 3 immediately after the operation stop thereof. In addition, even if the dilution water pump 4 is provided so that the outlet 4b of the dilution water pump 4 is disposed on the lower side of the inlet 26 of the electrolytic cell 2, the electrolyzed solution W4 from the electrolytic cell 2 can be prevented from flowing beyond the second electrolyzed solution advection-deterring portions 45 in the pipe 34 connected to the dilution water pump 4 immediately after the operation stop.

Consequently, the corrosion of component parts due to the electrolyzed solution W4 can be prevented, and it is possible to extend the lives of the component parts. In addition, it is possible to decrease the frequency of replacement of the component parts, and to provide an electrolysis water-making apparatus A having excellent durability, economic efficiency, and reliability.

Furthermore, by arranging the raw material solution tube 32 as described above, it is possible to reliably and easily form the electrolyzed solution advection-deterring portion 40 which is configured so that a part thereof near the other end 32b is disposed on the upper side of another part thereof near the one end 32a. In addition, by arranging the dilution water tube 34 as described above, it is possible to reliably and easily form the second electrolyzed solution advection-deterring portion 45 which is configured so that a part thereof near the other end 34b is disposed on the lower side of another part thereof near the one end 34a.

Hereinbefore, the fourth embodiment of the electrolysis water-making apparatus related to the present invention has been described. However, the present invention is not limited to the above-described fourth embodiment, and the configuration can be appropriately modified within the scope of the present invention, the scope including the modifications of the first, second and third embodiments.

Figure 30:
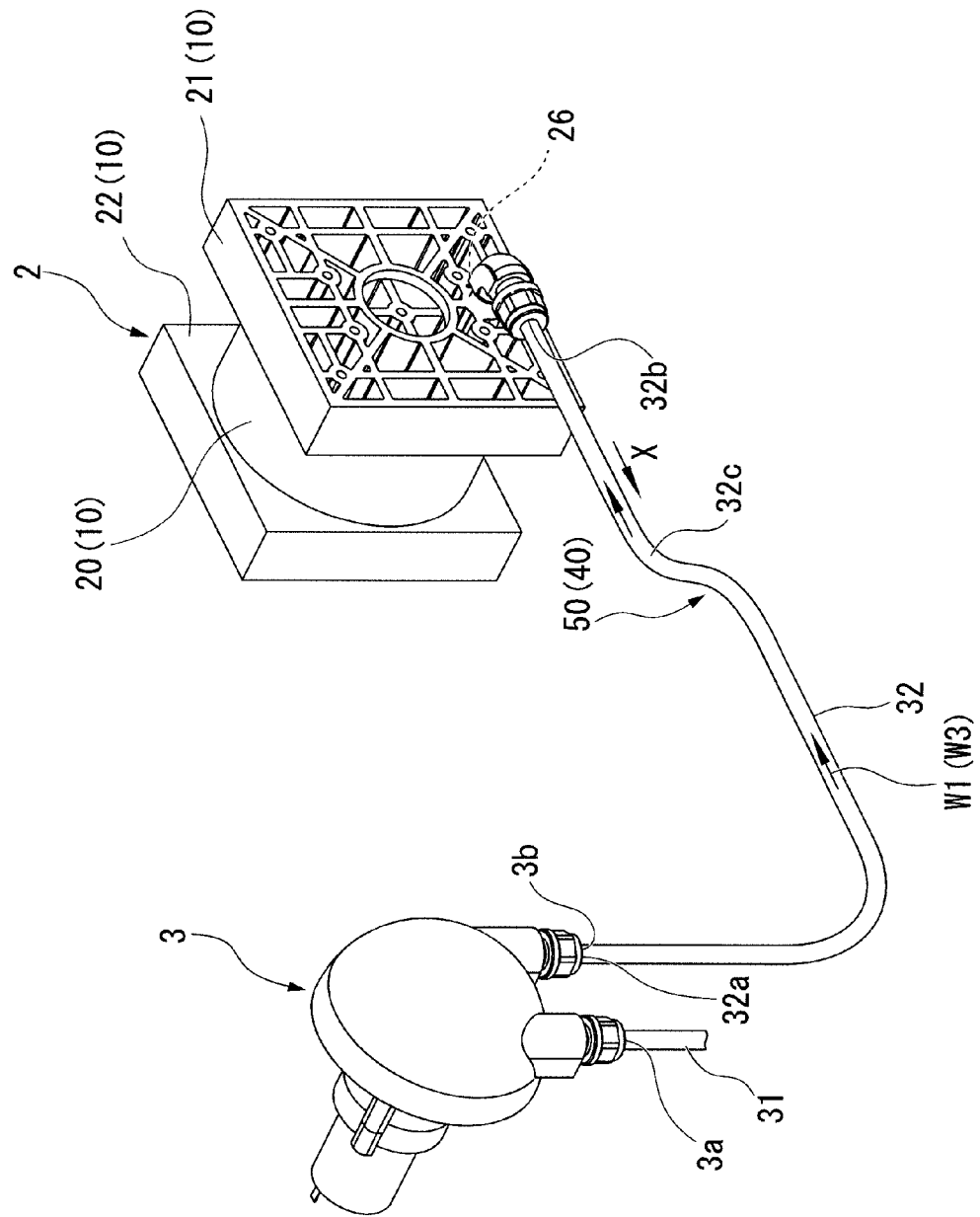
FIG. 30 is a perspective view showing a modification of the electrolysis water-making apparatus related to the fourth embodiment of the present invention, and is a view showing an electrolyzed solution advection-deterring portion of a raw material solution tube.
Figure 31:
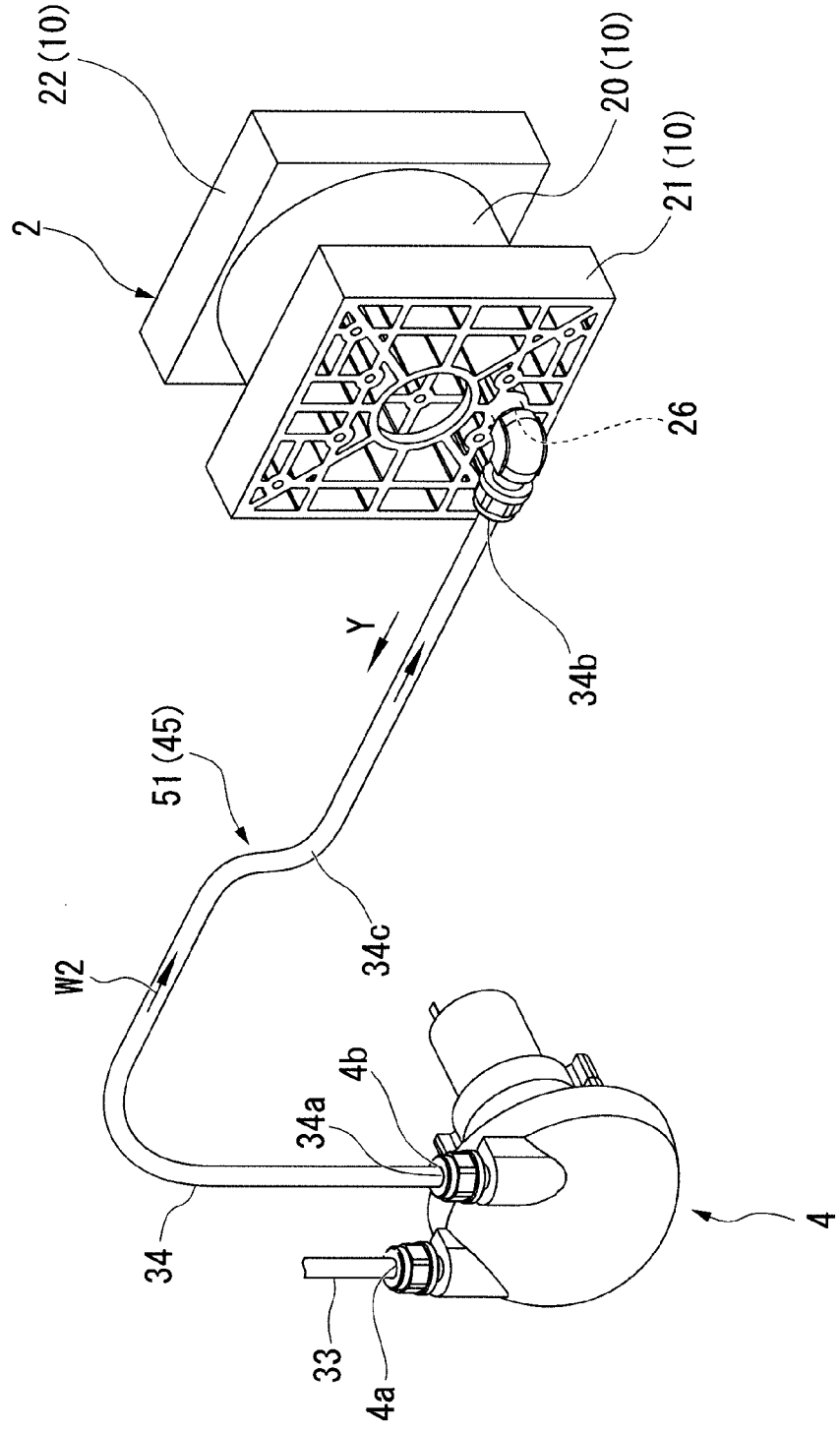
FIG. 31 is a perspective view showing a modification of the electrolysis water-making apparatus related to the fourth embodiment of the present invention, and is a view showing an electrolyzed solution advection-deterring portion of a dilution water tube.

For example, as shown in FIG. 10, in a case where each of the raw material solution feed pump 3 and the dilution water pump 4 is individually connected to the electrolytic cell 2 and where the undiluted solution W1 supplied from the raw material solution feed pump 3 and the dilution water W2 supplied from the dilution water pump 4 are mixed together inside the electrolytic cell 2, thereby letting the electrolyte solution W3 having a predetermined concentration flow in the electrolytic cell 2, it is only necessary to be configured as shown in FIGS. 30 and 31. In addition, as shown in FIG. 13, in a case where the electrolyte solution W3 which has been adjusted to have a predetermined concentration by mixing the undiluted solution W1 and the dilution water W2 beforehand is supplied into the electrolytic cell 2 by the raw material solution feed pump 3, it is only necessary to be configured as shown in FIG. 30.

Even in a case of being configured as described above, by forming the electrolyzed solution advection-deterring portions 40 and 45 in the raw material solution tube 32 and the dilution water tube 34 similar to this embodiment, it is possible to obtain the same operations and effects as that of this embodiment.

INDUSTRIAL APPLICABILITY

The present invention can be widely applied to an electrolysis water-making apparatus used to make electrolysis water by electrolyzing a raw material solution including a chlorine ion.

DESCRIPTION OF REFERENCE SIGNS 1 tank
2 electrolytic cell
3 raw material solution feed pump
3a inlet
3b outlet
4 dilution water pump
4a inlet
4b outlet (second outlet)
5 electrolysis power supply
6 mixer
10 casing
11, 12 electrode plate
13, 14, 15 spacer
16 electrode through-hole
17, 18 electrode
20 body
21, 22 side plate
26 inlet (inlet, second inlet)
27 outlet
28 electrolysis chamber
30 fluid channel
31 tube
32 raw material solution tube (raw material solution pipe)
32a one end
32b the other end
32c downward slope pipeline (pitched pipe)
33 tube
34 dilution water tube (dilution water pipe)
34a one end
34b the other end
34c upward slope pipeline (second pitched pipe)
35 T-fitting
36 tube (raw material solution pipe, dilution water pipe)
40 electrolyzed solution advection-deterring portion
41 U-shaped part
42 inverted U-shaped part
43 inverted U-shaped part
44 U-shaped part
45 second electrolyzed solution advection-deterring portion
46 test tube
47 test tube
50 tiered part
51 tiered part (second tiered part)

A electrolysis water-making apparatus
W1 undiluted water (raw material solution)
W2 water (dilution water)
W3 electrolyte solution (raw material solution)
W4 electrolyzed solution
W5 electrolysis-sterilized water (electrolysis water)

The invention claimed is:

1. An electrolysis water-making apparatus for making electrolysis water by electrolyzing a raw material solution including a chlorine ion, the electrolysis water-making apparatus comprising:
   an electrolytic cell;
   a raw material solution feed pump used to supply the raw material solution to the electrolytic cell;
   a raw material solution pipe connecting an outlet of the raw material solution feed pump allowing the raw material solution to be discharged therefrom and an inlet of the electrolytic cell allowing the raw material solution to flow thereinto; and
   an electrolyzed solution advection-deterring portion formed in the raw material solution pipe between the outlet and the inlet,
   wherein the raw material solution feed pump is provided so that the outlet is disposed on an upper side of the inlet, and
   wherein a pitched pipe in which an end thereof near the inlet is disposed on an upper side of another end thereof near the outlet is provided in at least a part of the electrolyzed solution advection-deterring portion.

2. The electrolysis water-making apparatus according to claim 1, further comprising:
   a dilution water pump used to supply dilution water used to dilute the raw material solution so that the raw material solution has a predetermined electrolyte concentration;
   a dilution water pipe connecting a second outlet of the dilution water pump allowing the dilution water to be discharged therefrom and a second inlet of the electrolytic cell allowing the dilution water to flow thereinto; and
   a second electrolyzed solution advection-deterring portion formed in the dilution water pipe between the second outlet and the second inlet,
   wherein the dilution water pump is provided so that the second outlet is disposed on a lower side of the second inlet, and
   wherein a second pitched pipe in which an end thereof near the second inlet is disposed on a lower side of another end thereof near the second outlet is provided in at least a part of the second electrolyzed solution advection-deterring portion.

3. The electrolysis water-making apparatus according to claim 1, further comprising a fixing means fixing the raw material solution pipe in a state where the electrolyzed solution advection-deterring portion is formed.

4. The electrolysis water-making apparatus according to claim 2, further comprising a second fixing means fixing the dilution water pipe in a state where the second electrolyzed solution advection-deterring portion is formed.

5. The electrolysis water-making apparatus according to any one of claims 1 to 4,
   wherein at least one of the electrolyzed solution advection-deterring portion and the second electrolyzed solution advection-deterring portion is formed into an annular shape wound around a central axis extending in a horizontal direction.

6. The electrolysis water-making apparatus according to any one of claims 1 to 4,
   wherein at least one of the electrolyzed solution advection-deterring portion and the second electrolyzed solution advection-deterring portion is formed to include at least one of a U-shaped part and an inverted U-shaped part curved around a central axis extending in a horizontal direction.

7. The electrolysis water-making apparatus according to any one of claims 1 to 4,
   wherein at least one of the electrolyzed solution advection-deterring portion and the second electrolyzed solution advection-deterring portion is formed into an annular shape wound around a central axis extending in a vertical direction.

8. The electrolysis water-making apparatus according to any one of claims 1 to 4,
   wherein the electrolyzed solution advection-deterring portion is formed to include a tiered part sloping upward as it approaches from the outlet toward the inlet.

9. The electrolysis water-making apparatus according to claim 2 or 4,
   wherein the second electrolyzed solution advection-deterring portion is formed to include a second tiered part sloping downward as it approaches from the second outlet toward the second inlet.

* * * * *